(12) United States Patent
Miyawaki et al.

(10) Patent No.: US 6,359,067 B1
(45) Date of Patent: Mar. 19, 2002

(54) THERMOSETTING POWDER COATING COMPOSITION

(75) Inventors: Takahisa Miyawaki; Yoshio Kikuta; Mitsuyuki Mizoguchi; Hiroyuki Sakayama; Tsuyoshi Matsumoto, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/446,660

(22) PCT Filed: Jul. 8, 1998

(86) PCT No.: PCT/JP98/03058

§ 371 Date: Dec. 23, 1999

§ 102(e) Date: Dec. 23, 1999

(87) PCT Pub. No.: WO99/02612

PCT Pub. Date: Jan. 21, 1999

(30) Foreign Application Priority Data

| Jul. 8, 1997 | (JP) | 9-182758 |
| Jul. 8, 1997 | (JP) | 9-182759 |
| Jul. 8, 1997 | (JP) | 9-182760 |
| Jul. 8, 1997 | (JP) | 9-182761 |

(51) Int. Cl.[7] .............................................. C08L 53/00
(52) U.S. Cl. ........................................................ 525/88
(58) Field of Search ............................................ 525/88

(56) References Cited

U.S. PATENT DOCUMENTS 4,871,837 A  10/1989  Reising et al. .............. 525/462

FOREIGN PATENT DOCUMENTS

| EP | 0314447  | 5/1989  |
| EP | 0440292  | 8/1991  |
| EP | 0509393  | 10/1992 |
| EP | 0750023  | 12/1996 |
| JP | 59230068 | 12/1984 |
| JP | 7-188587 | 7/1995  |
| JP | 9-12926  | 1/1997  |

*Primary Examiner*—Terressa M. Boykin
(74) *Attorney, Agent, or Firm*—Burns, Doane, Swecker, Mathis, L.L.P.

(57) ABSTRACT

A thermosetting powder coating composition which comprises a resin composition (A) having a sea-island type microphase separation structure constituted of a continuous phase (a sea phase) comprising an acrylic copolymer and a dispersion phase (an island phase) comprising a thermoplastic elastomer and a curing agent (B) and in which the total amount of a thermosetting elastomer (a-2) constituting the dispersion phase is in the range of 0.5 to 20 parts by weight with respect to 100 parts by weight of the resin composition (A). This powder coating composition is excellent in chipping resistance, impact resistance, weathering resistance and appearance properties, and it is particularly suitable for the coating of vehicles.

22 Claims, No Drawings

THERMOSETTING POWDER COATING COMPOSITION

TECHNICAL FIELD

The present invention relates to a thermosetting powder coating composition, and more specifically, it relates to a thermosetting powder coating composition which has excellent coating characteristics (impact resistance, chipping resistance, adhesive properties, weathering resistance and the like) and excellent coating appearance and which can particularly provide a baked coating film suitable for the use of automobile coating.

BACKGROUND ART

[Research development trend and expectation of a powder coating composition in the technical field of a coating composition from the viewpoints of ecology and the like]

Heretofore, solvent type coating compositions have been used for the coating of materials, and for use in the fields of automobiles and the like in which a severe quality is required, coating compositions which can meet various requirements have been developed and used. In recent years, in the technical field of the coating compositions, the change of from the solvent type coating composition to a powder type coating composition (hereinafter referred to as "the powder coating composition") has been expected from the viewpoints of local and global environmental protection, labor safety hygiene environmental improvement, the prevention of fire and explosion, the saving of resources, and the like.

As the expectation of the high function and diversification of the powder coating composition increases in accordance with historical and social demand, it becomes required that the powder coating composition possesses such high coating film performances (e.g., impact resistance and acid rain resistance) as to be equal to those of the solvent type coating composition.

However, the performances of a coating film which are required for the powder coating composition become more and more strict, but it is not always recognized that the powder compositions which can completely meet such requirements are on the market.

[Technical Background of Usual Powder Coating Compositions]

Typical examples of conventional powder coating compositions include epoxy resin and polyester resin powder coating compositions mainly comprising bisphenol A. In these coating compositions, however, weathering resistance is insufficient, and what is worse, the resistance to acid rain which is nowadays particularly noticeable is also insufficient. In consequence, these coating compositions are unsatisfactory in an outdoor use such as the coating of automobile bodies.

In order to overcome these drawbacks, an acrylic powder coating composition has been suggested in Japanese Patent Publication No. 38617/1973, whereby the weathering resistance has been remarkably improved. However, in points of impact resistance and chipping resistance, this acrylic powder coating composition is inferior to the conventional polyester-based powder coating composition. That is to say, the powder type coating composition which can simultaneously meet all of the weathering resistance, the impact resistance and the chipping resistance is not always considered to be on the market.

As understood from the above, the powder coating composition which can simultaneously satisfy the weathering resistance and the impact resistance is desired from the market, and research and development have been intensively conducted with the intention of putting such a coating composition to practical use.

[Technical background regarding the improvement of the impact resistance of the coating film of the acrylic powder coating composition]

In the course of the development regarding the acrylic powder coating composition, there have been disclosed techniques of improving low-temperature setting properties and re-coat properties in, for example, (1) Japanese Patent Application Laid-Open No. 112743/1993 in which a dibasic acid or the like is mixed, and (2) Japanese Patent Application Laid-Open No. 165463/1988 in which an alkyl titanate is mixed. In both the techniques, however, the impact resistance is merely mentioned as a secondary effect, and its effect is not always sufficient. Next, both the techniques (1) and (2) will be described.

(1) Japanese Patent Application Laid-Open No. 112743/1993

There is herein disclosed a technique of obtaining a powder type coating composition having the excellent setting properties. That is to say, the publication discloses a powder type coating composition which comprises (A) a copolymer having a glycidyl group, (B) an aliphatic or an alicyclic dibasic acid, its anhydride or a polyol-modified anhydride of the dibasic acid, and (C) if necessary, a pigment and other additives. This copolymer (A) has a number-average molecular weight (Mn) of 1,000 to 10,000 and a glass transition temperature of 30 to 90° C. Such a copolymer can be obtained from (a) at least 20% by weight of glycidyl acrylate or glycidyl methacrylate, (b) 35 to 50% by weight of styrene, (c) 10 to 45% by weight of one or more alkyl esters of an aliphatic unsaturated monocarboxylic acid or dicarboxylic acid, and (d) 0 to 50% by weight of one or more unsaturated other olefin monomers.

(2) Japanese Patent Application Laid-Open No. 165463/1988

In this publication, there is disclosed a thermosetting acrylic powder coating composition which contains a specific glycidyl group functional acrylic resin, an aliphatic dibasic acid (anhydride) and an alkyl titanate compound as main components and which can be molten and set at a low temperature and which can provide a coating film having excellent hardness, impact resistance, flexing resistance and the like. That is to say, there is herein disclosed a thermosetting acrylic powder coating composition mainly comprising (A) a glycidyl group functional acrylic resin obtained by copolymerizing an alkyl ester having 1 to 14 carbon atoms of (meth)acrylic acid and a glycidyl ester of (meth)acrylic acid as the main components, (B) an aliphatic dibasic acid (preferably adipic acid, sebacic acid, decanedicarboxylic acid, muconic acid or the like) or its acid anhydride, and (C) an alkyl titanate compound (e.g., tetrapentadecyl titanate) represented by $Ti(OR)_4$ (wherein R is an alkyl group having 15 to 20 carbon atoms).

The present inventors have intensively investigated coating films on the surfaces of bodies and chassis of vehicles such as automobiles against which gravel and pebbles hit at a high relative velocity during running and which are exposed to the sunlight outdoors without any shelter or severe weather conditions, and as a result, in the best mode of this technique, it has been confirmed that the impact resistance is excellent but the chipping resistance as well as the appearance and the weathering resistance of the coating films are poor. That is to say, this powder coating composition is not always suitable for the above-mentioned use application.

[Technical background regarding the improvement of the impact resistance of the coating film of a coating composition including a thermoplastic elastomer]

With regard to the improvement of the impact resistance of the coating film of the coating composition including a thermoplastic elastomer, for example, the following techniques (1) to (3) are disclosed. However, it is difficult to apply these techniques to thermosetting powder coating compositions and acrylic thermosetting powder coating compositions.

(1) Japanese Patent Publication Nos. 74367/1992 and 17721/1995

In these publications, there is disclosed a resin composition for a coating composition obtained by polymerizing a vinyl monomer (B) including 50% by weight or more of an acrylic ester or a methacrylic ester having an alkyl group of 1 to 8 carbon atoms or a cyclohexyl group in an inert solvent in which a hydrogenated compound of a styrene-butadiene-styrene block copolymer or a hydrogenated compound (A) of a styrene-butadiene-styrene block copolymer graft-modified with maleic acid or its acid anhydride is dissolved [a weight ratio (A/B)=2/8 to 7/3]. This resin composition for the coating composition is considered to be excellent in weathering resistance and to be suitable for adhesion to a metal or a plastic.

In these publications, however, the application of this resin composition for the coating composition to the thermosetting powder coating composition is neither disclosed nor implied at all. Furthermore, if the thermoplastic elastomer component is actually applied to the thermosetting powder coating composition in such a composition ratio as disclosed herein, some problems occur. For example, it is difficult to grind a kneaded material at ordinary temperature; the blocking resistance of the powder coating composition is poor; and the appearance and the weathering resistance of the coating film are impaired.

(2) Japanese Patent Publication No. 55630/1992

In this publication, there is disclosed a primer composition of A/B=99/1 to 60/40 and (A+B)/C=100/1 to 100/50 in a weight ratio of solid components, wherein A, B and C are essential components, and A is a resin obtained by graft polymerizing an α,β-unsaturated carboxylic acid or its anhydride to a styrene-butadiene-styrene block copolymer or a hydrogenated compound thereof; B is a crosslinking agent comprising at least one selected from the group consisting of amino resins, polymerizable unsaturated group-including compounds, acrylic resins having a carboxyl group, a hydroxyl group, an amino group or a methylol group, polyisocyanated compounds and blocked isocyanate compounds; and C is an epoxy compound.

In this publication, however, the application of this primer composition to the thermosetting powder coating composition is neither disclosed nor implied at all. Furthermore, if the thermoplastic elastomer components are actually applied to the thermosetting powder coating composition in such a composition ratio as disclosed herein, the same problems as in the above-mentioned technique (1) occur. Furthermore, when the non-hydrogenated styrene-butadiene-styrene block copolymer is used as a face coating composition on bodies and parts of vehicles such as automobiles which are exposed to the sunlight outdoors without any shelter and to severe weather conditions, the weathering resistance of the coating film is extremely poor. As one of its reasons, for example, the attack of ultraviolet rays to an unsaturated double bond is considered.

(3) Japanese Patent Application Laid-Open No. 236869/1987

In this publication, there is disclosed a polyester composition for a thermoplastic powder coating composition comprising a resin composition obtained by mixing (A) 100 parts by weight of a polyester copolymer with (B) 0.5 to 30 parts by weight of a modified olefinic polymer obtained by grafting 0.01 to 10% by weight of an unsaturated carboxylic acid or its derivative to a hydrogenated copolymer of a conjugated diene or a hydrogenated copolymer of the conjugated diene and an aromatic vinyl hydrocarbon. Here, "the hydrogenated" means the conception of adding hydrogen atoms to the unsaturated double bonds. This polyester composition is considered to possess good adhesive properties, impact resistance and heat cycle resistance.

However, this polyester composition is excellent in impact resistance and chipping resistance, but weathering resistance is not always sufficient, and since the polyester composition is the thermoplastic powder coating composition, it is supposed that its use applications are limited from the viewpoints of heat resistance and solvent resistance. For example, the application of this polyester composition to the surfaces of bodies and chassis of vehicles such as automobiles is limited. In this application, the coating film of the polyester composition is required to have hardness, gasoline resistance, weathering resistance and chipping resistance, because it is exposed to the sunlight outdoors without any shelter and to severe weather conditions, and gravel and pebbles hit against it at a high relative velocity during the running of the vehicle.

[Chipping Resistance]

The conception of the term "the chipping" referred to in this specification means the phenomenon of impact rupture at a time when a load is applied to a pinpoint for a short time, and particularly in the technical field of the coating compositions for automobiles, this conception also covers the phenomenon of flawing suffered on the coating film of an automobile body at a time when flying pebbles hit against the automobile. The conception of term "the chipping resistance" means the resistance of the coating film to "the chipping".

A typical example for an evaluation technique of the chipping resistance is a gravel shot test by the use of a gravel meter in accordance with SEA-J400, ASTM D-370 which is a test method of the coating film on the automobile. According to this evaluation technique, a pebble is allowed to hit against the coating film cooled to a predetermined temperature with a predetermined force, and a diameter of a flaw caused thereby is measured to evaluate the chipping resistance.

[Impact Resistance]

The conception of the term "the impact resistance" referred to in this specification means the phenomenon of impact rupture at a time when a load is applied to a large area for a short time, and particularly in the technical field of the coating composition for the automobile, this conception also covers the phenomenon of flawing suffered on the coating film of an automobile body at a time when the automobile collides with a large article.

A typical example for an evaluation technique of the impact resistance is an impact resistance test (a Du Pont type impact resistance test) in accordance with JIS K5400 6.13.3. In this evaluation technique, each of weights (two weights of 500 g and 1 kg) is dropped on the coating film, and a drop height at which a crack or peeling occurs on the coating film is measured to evaluate the impact resistance.

[Correlation between impact resistance and chipping resistance]

Heretofore, in the technical field of the powder coating composition, a difference between the conceptions of the impact resistance and the chipping resistance of the coating film has scarcely been recognized. In addition, the impact resistance of the coating film has been considered to be important sometimes, but the importance of the chipping resistance of the coating film has scarcely been noted.

That is to say, as for the impact resistance of the coating film, its evaluation has often been made, but the evaluation of the chipping resistance of the coating film has scarcely been done. Furthermore, that the impact resistance is excellent does not always mean that the chipping resistance is sufficient.

DISCLOSURE OF THE INVENTION

On the basis of the above-mentioned technical background, the present inventors have paid much attention to a fact that the improvement of impact resistance has been intended but the improvement of chipping resistance has scarcely been taken up as a theme in the conventional techniques described above, and hence it has been newly intended to impart not only the impact resistance but also the chipping resistance to a coating film formed from a powder coating composition.

That is to say, an object of the present invention is to provide a thermosetting powder coating composition which can improve weathering resistance that is the drawback of a coating film formed from an epoxy resin powder coating composition or a polyester powder coating composition and which has such excellent impact resistance as to be equal to that of the coating film formed from the polyester powder coating composition and which can form the coating film excellent in the chipping resistance to that a person skilled in the art has not heretofore paid attention.

In order to achieve the above object, the present inventors have intensively investigated on the basis of a quite novel technical idea that the conception of a toughening mechanism by a microphase separation structure in the field of "polymer alloy" is applied to the technical field of the powder coating composition, thereby simultaneously imparting the impact resistance and the chipping resistance to a coating film. As a result, the present inventors have found that the above object can be achieved by a novel contrivance that a thermoplastic elastomer substantially not having an unsaturated double bond is uniformly dispersed in a specific ratio in an acrylic copolymer component, and in consequence, the present invention has now been completed.

That is to say, the above object can be achieved by a thermosetting powder coating composition comprising a resin composition (A) and a curing agent (B), wherein
  the resin composition (A) has a sea-island microphase separation structure constituted of a continuous phase comprising an acrylic copolymer (a-1) and a dispersion phase comprising a thermoplastic elastomer (a-2),
  the acrylic copolymer (a-1) constituting the continuous phase is obtained by polymerizing 40 to 99% by weight of a vinyl monomer (a-1-1) not having a functional group reactive to the curing agent (B) in its molecule and having at least one radical polymerizable vinyl group with 60 to 1% by weight of a vinyl monomer (a-1-2) having a functional group reactive to the curing agent (B) in its molecule and having at least one radical polymerizable vinyl group,
  the thermoplastic elastomer (a-2) constituting the dispersion phase is at least one elastomer selected from the group consisting of non-graft-modified thermoplastic elastomers (a-2-1) and graft-modified thermoplastic elastomers (a-2-2), and
  the total amount of the thermoplastic elastomer (a-2) constituting the dispersion phase is within the range of 0.5 to 20 parts by weight with respect to 100 parts by weight of the resin composition (A).

In contrast to conventional techniques, a thermosetting powder coating composition of the present invention can be obtained by uniformly dispersing, as a dispersion phase (islands), a specified amount of a thermoplastic elastomer substantially not having an unsaturated double bond in the main chain in an acrylic polymer component which is a continuous phase (the sea), and then combining the resultant dispersion with a suitably selected curing agent. Such a structure can impart excellent impact resistance and chipping resistance to the whole cured coating film.

The present invention is different from an invention described in Japanese Patent Publication No. 55630/1992 in the following points. A primer composition disclosed in Japanese Patent Publication No. 55630/1992 is common to the powder coating composition of the present invention in point of a fact that both the compositions are used for the coating of automobile bodies. However, the powder coating composition of the present invention can suitably be used for "a face coating" in which a severe coating performance is required, but in contrast, the primer composition disclosed in Japanese Patent Publication No. 55630/1992 is used as a primer (e.g., a coating composition for intercoat, a coating composition for ground coat, a coating composition for undercoat, a coating composition for rust resisting coat, or the like) in which the severe coating performance is not required. In this point, both the compositions are also definitely different from each other. That is to say, the powder coating composition of the present invention intends to satisfy severer conditions than the primer composition disclosed in Japanese Patent Publication No. 55630/1992.

Furthermore, both the compositions are different in a composition ratio (% by weight) of a styrene-butadiene-styrene block copolymer or its hydrogenated compound, i.e., the thermoplastic elastomer (a-2). In the present invention, the total amount of the thermoplastic elastomer (a-2) is limited to a low content of 0.5 to 20 parts by weight with respect to 100 parts by weight of the resin composition (A). In consequence, when the coating film is formed, an excellent coating performance such as weathering resistance can be acquired.

In addition, both the compositions are different in their form. In Japanese Patent Publication No. 55630/1992, a solvent type coating composition (a type of the coating composition in which a resin for the coating composition, a curing agent and the like are dissolved in an organic solvent, and after coating, the organic solvent is volatilized to form a coating film) alone is disclosed as the form of the coating composition, and this publication neither discloses nor suggests a use as a resin for the thermosetting powder coating composition anywhere. Usually, the solvent type coating composition and the power type coating composition (the thermosetting powder coating composition) are utterly different in the formation mechanism of the coating film, and therefore, they are largely different from each other in molecular characteristics of the resin component constituting the coating composition (e.g., the prescription of monomers at polymerization, a molecular weight and a molecular weight distribution after the polymerization, the kind and amount of reactive functional group in the molecule, and thermal properties such as a melting point and a glass transition point), a composition ratio, and the kind and composition ratio of curing agent component.

Best Mode of Carrying Out the Invention

[Thermoplastic elastomer (a-2)]

It is preferred that the main chain of a thermoplastic elastomer (a-2) which can be used in the present invention mainly comprises a polyolefin which does not substantially have any unsaturated double bond and which includes at least 50% by weight of a polyolefin chain in the molecule. In the case that the main chain does not substantially have any unsaturated double bond, the weathering resistance of the resultant coating film can be improved. This thermoplastic elastomer (a-2) is selected from the group consisting of non-graft-modified thermoplastic elastomers (a-2-1) and graft-modified thermoplastic elastomers (a-2-2).

[Non-graft-modified thermoplastic elastomer (a-2-1)]

Preferable examples of the non-graft-modified thermoplastic elastomer (a-2-1) include a styrene-based thermoplastic elastomer (a-2-1a) which is a copolymer substantially not having an unsaturated double bond in the main chain and which is constituted of a hydrogenated compound (SEBS) of an S-B-S type three-dimensional block copolymer comprising a hard segment S obtained by polymerizing an aromatic vinyl hydrocarbon and a soft segment B obtained by polymerizing a conjugated diene, a polyolefin-based thermoplastic elastomer (a-2-1b) which is a copolymer substantially not having an unsaturated double bond in the main chain and which is constituted of a hard segment obtained by polymerizing ethylene and/or propylene and a soft segment obtained by copolymerizing ethylene and/or an α-olefin having 3 or more carbon atoms, a thermoplastic elastomer (a-2-1c) substantially not having an unsaturated double bond in the main chain and obtained by copolymerizing ethylene and vinyl acetate and/or a (meth)acrylic ester, and a thermoplastic elastomer (a-2-1d) substantially not having an unsaturated double bond in the main chain and obtained by copolymerizing ethylene and a (meth)acrylic acid.

[Styrene-based thermoplastic elastomer (a-2-1a)]

The conception of the term "styrene-based thermoplastic elastomer" referred to in the claims and the specification of the present application also covers a general conception regarding styrene-based thermoplastic elastomers described in, for example, "Practical Plastic Dictionary, 2nd Print" (Practical Plastic Dictionary, edited by Editorial Committee, published by Industrial Investigation Society, 1994) (e.g., a general conception described on pages 186 and 187 of the same dictionary). This description is all regarded as a part of the disclosure of this specification by clearly indicating the cited literature and the cited range, and it is regarded as a matter or a disclosure derived directly and in the form of one meaning by a person skilled in the art in view of the matter or the disclosure described in this specification by referring to the cited range clearly indicated.

Preferable examples of the styrene-based thermoplastic elastomer (a-2-1a) include a hydrogenated compound of a styrene-butadiene-styrene block copolymer and a hydrogenated compound of a styrene-isoprene-styrene block copolymer.

Some preparation methods of the styrene-butadiene-styrene block copolymer are heretofore known, and a typical method thereof is disclosed in U.S. Pat. No. 3,265,765. The elastomer having an improved thermal stability can be obtained by the so-called hydrogenation which comprises adding hydrogen atoms to unsaturated double bonds in the molecule of this block copolymer. The preparation methods of the thus hydrogenated styrene-based thermoplastic elastomer are described in, for example, Japanese Patent Publication Nos. 8704/1967, 6636/1968, 20504/1970 and 3555/1973. Such a hydrogenated compound is commercially sold under, for example, the grade name of KRATON G and, for example, the code name of #1652 from Shell Chemical Company.

A hydrogenation ratio of olefinic unsaturated bonds in a diene polymer moiety in the styrene-based thermoplastic elastomer (a-2-1a) is preferably 90% or more in consideration of the weathering resistance and the like of a coating film.

The diene polymer block in the styrene-based thermoplastic elastomer (a-2-1a) is, for example, a copolymer block mainly comprising butadiene and/or isoprene, and it may be a copolymer block in which another conjugated diene and an α-olefin such as propylene are randomly copolymerized.

A copolymerization ratio (weight ratio) between a conjugated diene component and an aromatic vinyl hydrocarbon component in the styrene-based thermoplastic elastomer (a-2-1a) is preferably in the range of 50/50 to 80/20. If the copolymerization ratio is within the above range, compatibility with the acrylic copolymer (a-1) is further improved.

[Polyolefin-based thermoplastic elastomer (a-2-1b)]

The conception of the term "polyolefin-based thermoplastic elastomer" referred to in the claims and the specification of the present application also covers a general conception regarding polyolefin-based thermoplastic elastomers described in, for example, "Practical Plastic Dictionary, 2nd Print" (Practical Plastic Dictionary, edited by Editorial Committee, published by Industrial Investigation Society, 1994) (e.g., a general conception described on page 187 of the same dictionary) and "Chemical Products of 12394" (published by Chemical Industry Nippou Company, 1994). These descriptions are all regarded as a part of the disclosure of this specification by clearly indicating the cited literature and the cited range, and it is regarded as a matter or a disclosure derived directly and in the form of one meaning by a person skilled in the art in view of the matter or the disclosure described in this specification by referring to the cited range clearly indicated.

No particular restriction is put on a preparation method of the polyolefin-based thermoplastic elastomer (a-2-1b). Such an elastomer is commercially sold under, for example, the grade name of MILASTOMER and, for example, the code name of 5510B from Mitsui Chemicals, Inc.

[Thermoplastic elastomer (a-2-1c) obtained by copolymerizing ethylene with vinyl acetate and/or a (meth)acrylic ester]

No particular restriction is put on a preparation method of the thermoplastic elastomer (a-2-1c). In the case that ethylene and vinyl acetate are copolymerized, a copolymerization ratio of vinyl acetate in the copolymer is preferably in the range of 10 to 50% by weight, more preferably 30 to 45% by weight. If the copolymerization ratio of vinyl acetate is within the above range, compatibility with the acrylic copolymer (a-1) is improved, and as a result, the resultant coating film is excellent in appearance, and characteristics such as solvent resistant of the coating film are also improved.

The thermoplastic elastomer obtained by copolymerizing ethylene with vinyl acetate is commercially sold under the name of "EVAFLEX" and, for example, the code name of EV45X from Mitsui-Du Pont Polychemical Co., Ltd.

A preferable example of the thermoplastic elastomer obtained by copolymerizing ethylene and a (meth)acrylic ester is a random copolymer of ethylene and ethyl acrylate. A copolymer ratio of the (meth)acrylic ester in the copolymer is preferably in the range of 10 to 45% by weight, more preferably 20 to 30% by weight. If the copolymer ratio of the (meth)acrylic ester is within the above range, the dispersion properties of the elastomer in the acrylic copolymer (a-1) are good, so that the resultant film coating is excellent in appearance.

The thermoplastic elastomer comprising the random copolymer of ethylene and ethyl acrylate is commercially sold under, for example, the name of "EVAFLEX-EEA" and, for example, the code name of A-704 from Mitsui-Du Pont Polychemical Co., Ltd.

[Thermoplastic elastomer (a-2-1d) obtained by copolymerizing ethylene and (meth)acrylic acid]

No particular restriction is put on a preparation method of the thermoplastic elastomer (a-2-1d). A preferable example of the thermoplastic elastomer (a-2-1d) is a copolymer of ethylene and methacrylic acid. A copolymerization ratio of (meth)acrylic acid in the copolymer components is preferably in the range of 1 to 10% by weight. If this ratio is within the above range, the dispersion properties of the elastomer in the acrylic copolymer (a-1) are good, so that the resultant film coating is excellent in appearance. The above ratio is more preferably within the range of 1 to 5% by weight.

This thermoplastic elastomer (a-2-1d) is commercially sold under, for example, the name of "NUCREL" and, for example, the code name of N0200H from Mitsui-Du Pont Polychemical Co., Ltd.

[Graft-modified thermoplastic elastomer (a-2-2)]

The employment of the graft-modified thermoplastic elastomer (a-2-2) permits a crosslinking reaction between the vinyl monomer (a-1-2) and the curing agent (B), contributes to compatibilization with the curing agent (B), and further improves the appearance, the impact resistance, the solvent resistance and the like of the coating film.

Preferable examples of the graft-modified thermoplastic elastomer (a-2-2) include grafted compounds (a-2-2a) to (a-2-2d) of thermoplastic elastomers having any of the above thermoplastic elastomers (a-2-1a) to (a-2-1d) as a main chain.

Each of the grafted compounds (a-2-2a) to (a-2-2d) of the thermoplastic elastomers may be a grafted compound obtained by graft polymerizing, to a hydrogenated portion of the main chain of the styrene-based thermoplastic elastomer (a-2-1a), the vinyl monomer (a-1-1) or the vinyl monomer (a-1-2) which can be added to a reaction system to obtain the acrylic copolymer (a-1) or another vinyl monomer; a grafted compound obtained by first introducing a compound containing a reactive functional group such as an α,β-unsaturated carboxylic acid or its anhydride as a side chain of the thermoplastic elastomers (a-2-1a) to (a-2-1c), and then bonding the introduced compound to the functional group of the acrylic copolymer (a-1) or graft polymerizing the vinyl monomer thereto; or a grafted compound obtained by bonding the functional group portion of the thermoplastic elastomer (a-2-1d) to the functional group of the acrylic copolymer (a-1) or graft polymerizing the vinyl monomer (a-1-1) or the vinyl monomer (a-1-2).

Preferable examples of a vinyl monomer-grafted compound (a-2-3a) of the styrene-based thermoplastic elastomer include a hydrogenated compound of a styrene-butadiene-styrene block copolymer graft-modified with an α,β-unsaturated carboxylic acid or its anhydride, and a hydrogenated compound of a styrene-isoprene-styrene block copolymer graft-modified with an α,β-unsaturated carboxylic acid or its anhydride. They can be obtained by hydrogenating a diene polymer portion of a styrene-butadiene-styrene block copolymer and/or a styrene-isoprene-styrene block copolymer, and then graft-modifying the hydrogenated compound with an α,β-unsaturated carboxylic acid or its anhydride. Such grafted compounds are mentioned in, for example, Japanese Patent Application Laid-Open No. 192743/1986.

Typical examples of the α,β-unsaturated carboxylic acid and its anhydride for use in the graft-modification include acrylic acid, methacrylic acid, maleic acid, itaconic acid, citraconic acid, crotonic acid, fumaric acid and maleic anhydride. When a polybasic acid such as maleic acid or fumaric acid is used, its half alkyl ester may be acceptable.

An amount (modification amount) of the α,β-unsaturated carboxylic acid or its anhydride is preferably in the range of 0.1 to 10% by weight. If this modification amount is less than 10% by weight, a gel substance is scarcely produced during the preparation of the resin composition (A), so that the appearance of the coating film can be prevented from deteriorating. Particularly when the vinyl monomer having an epoxy group and/or a glycidyl group is used as the component to be grafted, it is especially preferred that the modification amount is within the above range. Furthermore, this modification amount is more preferably in the range of 0.1 to 5% by weight.

Also in the case that a grafted compound obtained by copolymerizing ethylene and (meth)acrylic acid to form the thermoplastic elastomer (a-2-1d), and finally grafting the same is used as the thermoplastic elastomer component (a-2), it is preferred for the same reason that a copolymerization amount of (meth)acrylic acid in the copolymer is in the range of 1.0 to 5.0 parts by weight.

For the graft-modification, in place of the α,β-unsaturated carboxylic acid or its anhydride, another vinyl monomer may be used. Typical examples of the other vinyl monomer include hydroxyethyl acrylate, 2-hydroxypropyl acrylate, 3-hydroxypropyl acrylate, butanediol monoacrylate, polyethylene glycol monoacrylate and corresponding methacrylates thereof, N-methylolacrylamide, allyl alcohol, hydroxyl group-including vinyl monomers such as hydroxyethyl vinyl ether and hydroxyethyl butyl maleate, and glycidyl group-including vinyl monomers such as glycidyl methacrylate, glycidyl acrylate, β-methylglycidyl methacrylate, β-methylglycidyl acrylate and acryl glycidyl ether.

As graft-modification techniques, there are, for example, a method which comprises reacting the thermoplastic elastomer with the vinyl monomer in the presence of a radical polymerization initiator in an extruder, and a method which comprises dispersing the thermoplastic elastomer in an aromatic hydrocarbon solvent such as toluene, xylene or benzene in which the radical polymerization initiator is dissolved, feeding the above vinyl monomer and the radical polymerization initiator to the resultant dispersion, and heating the system to carry out a radical reaction. Incidentally, the graft reaction referred to herein means that the above vinyl monomer chemically bonds to the styrene-based thermoplastic elastomer.

Typical examples of the radical polymerization initiator for use in the graft-modification include tert-butylcumyl peroxide, di-tert-butyl peroxide, dicumyl peroxide, 2,5-dimethyl-2,5-di(tert-butylperoxy)hexane and 2,5-dimethyl-2,5-di(tert-butylperoxy)hexane-3.

The maleic anhydride-modified polyolefin-based thermoplastic elastomer which is the grafted compound (a-2-2b) of the polyolefin-based thermoplastic elastomer is commercially sold under the grade name of Toughmer and, for example, the code name of MP0620 or MP0610 from Mitsui Chemicals, Inc.

[Weight-average molecular weight of the thermoplastic elastomer (a-2)]

The weight-average molecular weight of the thermoplastic elastomer (a-2) is preferably in the range of 2,000 to 400,000, more preferably 10,000 to 200,000. If this weight-average molecular weight is within the above range, the chipping resistance of the coating film is good, and the smoothness of the coating film is not impaired. This weight-average molecular weight can be measured by gel permeation chromatography (GPC).

[Amount of the thermoplastic elastomer (a-2) to be used]

The amount of the thermoplastic elastomer (a-2) constituting a dispersion phase (island phase) is in the range of 0.5 to 20 parts by weight with respect to 100 parts by weight of the resin component (A) for the powder coating composition. If this amount is less than 0.5 part by weight, the improvement of the chipping resistance is insufficient, and if it is more than 20 parts by weight, the dispersion of the elastomer in the acrylic copolymer (a-1) which is a continuous phase (sea phase) is insufficient, so that the smoothness and the weathering resistance of the coating film as well as the blocking resistance of the powder coating composition tend to be impaired. The amount of the elastomer to be used is preferably in the range of 0.5 to 15 parts by weight.

In the case that the graft-modified thermoplastic elastomer (a-2-2) is used, 0.5 to 20 parts by weight which is the amount of the thermoplastic elastomer (a-2) to be used also include a graft portion. The graft-modified thermoplastic elastomer (a-2-2) including the graft portion can be separated from the acrylic polymer (a-1) by a specific solvent, whereby a composition ratio (the amount) can be confirmed.

[Acrylic copolymer (a-1)]

The acrylic copolymer (a-1) does not possess, in the molecule, a functional group reactive to the curing agent (B), and can be obtained by polymerizing 40 to 99% by weight of the vinyl monomer (a-1-1) having at least one radical polymerizable vinyl group and 60 to 1% by weight of the vinyl monomer (a-1-2) having a functional group reactive-to the curing agent (B) in the molecule and at least one radical polymerizable vinyl group.

Together with the curing agent (B) which will be described hereinafter, this acrylic copolymer (a-1) largely contributes to the exertion of excellent appearance, weathering resistance and coating film properties (impact resistance, acid resistance and the like) in use applications, in which the excellent appearance (smoothness, reflectibility or the like) is required, such as the surfaces of bodies and chassis of vehicles such as automobiles against which gravel and pebbles hit at a high relative velocity during running or which are exposed to the sunlight outdoors without any shelter or severe weather conditions.

[vinyl monomer (a-1-1)]

No particular restriction is put on the vinyl monomer (a-1-1), so long as it is a monomer having no functional group reactive to the curing agent (B) in the molecule but having at least one radical polymerizable vinyl group. This vinyl monomer (a-1-1) can be considered to contribute to the improvement of the weathering resistance of the obtained coating film, adhesiveness to a base material, and hardness.

With regard to the vinyl monomer (a-1-1), it is preferred that the (meth)acrylic ester having an alkyl group of 1 to 14 carbon atoms and/or a cyclohexyl group is used in an amount of 50 to 100% by weight in 100% by weight of the vinyl monomer (a-1-1). Typical examples of the vinyl monomer (a-1-1) include (meth)acrylic acids and their derivative having groups such as methyl, ethyl, n-propyl, n-butyl, isobutyl, n-amyl, isoamyl, n-hexyl, cyclohexyl, 2-ethylhexyl, octyl, 2-ethyloctyl, decyl, dodecyl, cyclohexyl and isobornyl. They may be used singly or in a combination of two or more thereof.

When the amount of the (meth)acrylic ester having the alkyl group of 1 to 14 carbon atoms and/or the cyclohexyl group is more than 50% by weight, the coating film having more excellent weathering resistance and coloring prevention can be obtained.

Furthermore, other typical examples of the vinyl monomer (a-1-1) include aromatic vinyl compounds such as styrene, a-methylstyrene and vinyltoluene, esters of unsaturated dicarboxylic acids such as maleic acid and itaconic acid, halogenated ethylenic unsaturated monomers such as vinyl fluoride, monochlorotrifluoroethylene, tetrafluoroethylene and chloroprene, nitrites such as acrylonitrile and methacrylonitrile, alkyl vinyl ethers such as lauryl vinyl ether, nitrogen-containing vinyl compounds such as vinyl pyrrolidone and 4-vinylpyrrolidone, amides such as vinylamide, acrylamide and methacrylamide, and ethylenic unsaturated monomers, for example, hydroxyl group-containing vinyl monomers such as hydroxyethyl methacrylate and 2-hydroxypropyl methacrylate. They may be used singly or in a combination of two or more thereof.

[Vinyl monomer (a-1-2)]

No particular restriction is put on the vinyl monomer (a-1-2), so long as it is a monomer having a functional group reactive to the curing agent (B) in the molecule and having at least one radical polymerizable vinyl group. Examples of the functional group reactive to the curing agent (B) include non-radical polymerizable functional groups such as a glycidyl group, an epoxy group, a hydroxyl group, a carboxyl group and acid anhydride groups.

The preferable vinyl monomer (a-1-2) preferably has at least one epoxy group and/or glycidyl group in the molecule and having at least one radical polymerizable vinyl group in the molecule. Typical examples of the vinyl monomer include glycidyl (meth)acrylate, β-methylglycidyl (meth) acrylate and acryl glycidyl ether. Glycidyl (meth)acrylate and β-methylglycidyl (meth)acrylate are more preferable, and glycidyl (meth)acrylate is most preferable.

Other typical examples of the vinyl monomer (a-1-2) include monomers having an alicyclic type epoxy group such as Cyclomer M100, Cyclomer M101 and Cyclomer A-200 (trade names, made by Daisel Petroleum Chemical Industry Ltd.). These vinyl monomers (a-1-2) may be used singly or in a combination of two or more thereof.

[Amounts of the vinyl monomers (a-1-1) and (a-1-2) to be used]

An amount of the vinyl monomer (a-1-1) [e.g., a (meth) acrylic monomer] to be used is in the range of 40 to 99% by weight based on the total amount of the acrylic copolymer (a-1), and it is preferably in the range of 60 to 99% by weight, more preferably 80 to 99% by weight.

[Derivative]

The conception of the term "derivative" referred to in the present application means a compound in which a hydrogen atom of a specific compound is replaced with another atom or an atomic group R. Here, R is a monovalent hydrocarbon group including at least one carbon atom. More concretely, R may be an aliphatic moiety, an alicyclic moiety having a substantially low aromatic degree, a group comprising a combination thereof, or a divalent residue in which any of the above groups is combined with a hydroxyl group, a carboxyl group, an amino group, nitrogen, sulfur, silicon or phosphorus, and above all, the aliphatic moiety in a narrow sense is preferable. R may be any of the above groups which are each substituted by an alkyl group, a cycloalkyl group, an allyl group, an alkoxyl group, a cycloalkoxyl group, an allyloxyl group, a halogen (F, Cl, Br or the like) or the like.

The suitable selection of these substituents permits controlling some characteristics of the coating film formed from the powder coating composition regarding the present invention.

[Glass transition point]

In view of the storage stability of the powder coating composition, the smoothness of the coating film caused by the flowability deterioration of the coating composition during the baking of the powder coating composition, and the like, it is desirable to select the vinyl monomers (a-1-1) and (a-1-2) so that a calculated value (Tg) of the glass transition point of the acrylic copolymer (a-1) may be in the range of 30 to 120° C. (preferably 40 to 110° C.). Here, the calculated value (Tg) of the glass transition point is a calculated value in the case that the vinyl monomers (a-1-1) and (a-1-2) alone are copolymerized.

[Evaluation of the calculated value of the glass transition point, a glass transition point (Tg) of a heteropolymer]

A glass transition point (Tg) of a polymer having a specific monomer composition can be obtained by the calculation of a Fox's equation. Here, the Fox's equation is an equation by which a Tg of a copolymer constituted of monomers can be calculated on the basis of Tg's of homopolymers of the respective monomers. Its detail is described in Bulletin of the American Physical Society, Series 2, Vol. 1, No. 3, p. 123 (1956).

With regard to the Tg's of various ethylenic unsaturated monomers which are foundations for the evaluation of the Tg of the copolymer in accordance with the Fox's equation, there can be employed values mentioned in, for example, Table 10-2 (main raw material monomers of acrylic resins for coating compositions) on pages 168 and 169 of New Polymer Library, Vol. 7, Introduction to Synthetic Resins for Coating Compositions (written by Kyouzou Kitaoka, published by Polymer Publication Society, Kyoto, 1974).

These descriptions are all regarded as a part of the disclosure of this specification by clearly indicating the cited literature and the cited range, and it is regarded as a matter or a disclosure derived directly and in the form of one meaning by a person skilled in the art in view of the matter or the disclosure described in this specification by referring to the cited range clearly indicated.

[Number-average molecular weight of the acrylic copolymer (a-1)]

A number-average molecular weight of the acrylic copolymer (a-1) is preferably in the range of about 1,000 to about 20,000, more preferably about 2,000 to about 10,000. If this number-average molecular weight is more than about 1,000, the storage stability of the coating composition is usually good. This number-average molecular weight can be evaluated on the basis of polystyrene by gel permeation chromatography (GPC).

A molecular weight of the acrylic copolymer (a-1) can be adjusted by using., for example, a means of performing the polymerization in the presence of a chain transfer agent of a mercaptan such as dodecylmercaptan, a disulfide such as dibenzoyl sulfide, an alkyl ester having 1 to 18 carbon atoms of thioglycolic acid such as 2-ethylhexyl thioglycolate, or a halogenated hydrocarbon such as urea tetrabromide, and an organic solvent such as isopropyl alcohol, isopropylbenzene or toluene which can increase a chain transfer effect.

[Synthetic method of the acrylic copolymer (a-1)]

No particular restriction is put on a synthetic method of the acrylic copolymer (a-1), so long as it substantially permits obtaining the copolymer having desired characteristics, but a radical solution polymerization method is suitably used.

[Radical polymerization initiator]

As examples of a radical polymerization initiator for use in the radical polymerization, organic peroxides, azonitriles and the like can be enumerated. Examples of the organic peroxides include alkyl peroxides, aryl peroxides, acyl peroxides, aroyl peroxides, ketone peroxides, peroxy carbonates and peroxy carboxylates. Examples of the alkyl peroxides include diisopropyl peroxide, ditertiary butyl peroxide, ditertiary amylperoxide, tertiary butyl peroxy-2-ethyl hexanoate, tertiary amyl peroxy-2-ethyl xanoate and tertiary butyl hydroperoxide; examples of the aryl peroxides include dicumyl peroxide and cumyl hydroperoxide; an example of the acyl peroxides includes dilauroyl peroxide; an example of the aroyl peroxides includes dibenzoyl peroxide; examples of the ketone peroxides include methyl ethyl ketone peroxide and cyclohexanone peroxide. Examples of the azonitriles include azobisisobutyronitrile and azobisisopropylnitrile.

[With regard to a dispersion method of the thermoplastic elastomer (a-2)]

No particular restriction is put on a preparation method of the resin composition (A) by dispersing the thermoplastic elastomer (a-2) which is the dispersion phase (island phase) in the acrylic copolymer (a-1) which is the continuous phase (sea phase) in a specific weight ratio, so long as it permits the preparation of a substantially desired resin composition (A). Nevertheless, typical examples of a suitable preparation technique include the following methods (1) to (4).

(1) A method for preparing the resin composition (A) by previously melting and kneading desired amounts of the thermoplastic elastomer (a-2) and the acrylic copolymer (a-1) alone within a desired kneading temperature range. In this case, as a melting and kneading device, there can be used a heating kneader, a screw extruder or the like.

(2) A method for preparing the substantially volatiles-free resin composition (A) by dissolving the acrylic copolymer (a-1) in an aromatic organic solvent to form an organic solvent solution, further dissolving a desired amount of the thermoplastic elastomer (a-2) in the organic solvent solution, uniformly dispersing it under heating (100 to 180° C.), and then removing the organic solvent from the resultant mixed solution (or the slurry).

(3) A method for preparing the substantially volatiles-free resin composition (A) by dissolving a desired amount of the thermoplastic elastomer (a-2) in a aromatic organic solvent to form an organic solvent solution, further dissolving the acrylic copolymer (a-1) in the organic solvent solution, uniformly dispersing it under heating (100 to 180° C.), and then removing the organic solvent from the resultant mixed solution (or the slurry).

(4) A method which comprises adding at one time or gradually adding dropwise the vinyl monomer (a-1-1) and the vinyl monomer (a-1-2) containing a dissolved radical polymerization initiator to an inert solvent containing a desired amount of the dissolved thermoplastic elastomer (a-2), and then heating the solution at 60 to 160° C. under stirring to carry out a radical solution polymerization for 1 to 24 hours. A product obtained by this radical polymerization is a solution in which the resin composition (A) is dissolved in the inert solvent, and hence, by removing the organic solvent, the substantially volatiles-free resin composition (A) can be obtained.

In the above methods (1), (2) and (3), for example, in the case that a thermoplastic elastomer which does not react with the reactive functional group of the vinyl monomer component (a-1-2) is used as the thermoplastic elastomer (a-2), a polymer alloy can be formed in which the non-graft-modified thermoplastic elastomer (a-2-1) is uniformly dispersed as a dispersion phase in the acrylic copolymer (a-1) which is the continuous phase.

Furthermore, for example, in the case that a thermoplastic elastomer which is reactable with the reactive functional group of the vinyl monomer component (a-1-2) is used as the thermoplastic elastomer (a-2), the thermoplastic elastomer reacts with the reactive functional group in the acrylic copolymer (a-1), thereby forming a polymer alloy in which the acrylic copolymer of the thermoplastic elastomer is uniformly dispersed as a dispersion phase in the acrylic copolymer (a-1) which is the continuous phase.

Additionally, for example, in the case that the thermoplastic elastomer (a-2-1d) obtained by copolymerizing ethylene and (meth)acrylic acid is used as the thermoplastic elastomer (a-2) and a vinyl monomer having an epoxy group and/or a glycidyl group is used as the vinyl monomer (a-1-2), the carboxyl group of the thermoplastic elastomer (a-2-1d) reacts with the epoxy group and/or the glycidyl group in the acrylic copolymer (a-1), thereby forming a polymer alloy in which the grafted acrylic copolymer of the thermoplastic elastomer is uniformly dispersed as a dispersion phase in the acrylic copolymer (a-1) which is the continuous phase.

On the other hand, in the above method (4), for example, in the case that a thermoplastic elastomer which does not react with the reactive functional group of the vinyl monomer component (a-1-2) is used as the thermoplastic elastomer (a-2), there can be formed a polymer alloy where the non-graft-modified thermoplastic elastomer (a-2-1) is uniformly dispersed as a dispersion phase in the acrylic copolymer (a-1) which is the continuous phase and/or where a grafted compound obtained by reacting part of the vinyl monomers (a-1-1) and (a-1-2) with the thermoplastic elastomer owing to the reaction of the thermoplastic elastomer (a-2) and vinyl group moieties of the vinyl monomers (a-1-1) and (a-1-2) is uniformly dispersed.

Furthermore, for example, in the case that a thermoplastic elastomer which is reactable with the reactive functional group of the vinyl monomer component (a-1-2) is used as the thermoplastic elastomer (a-2), the thermoplastic elastomer reacts with the reactive functional group in the acrylic copolymer (a-1) and/or the reactive functional group in the vinyl monomer component (a-1-2), thereby forming a polymer alloy in which the non-graft-modified-thermoplastic elastomer (a-2-1), the grafted acrylic copolymer of the thermoplastic elastomer and/or the grafted vinyl monomer of the thermoplastic elastomer are uniformly dispersed as dispersion phases in the acrylic copolymer (a-1) which is the continuous phase.

Additionally, for example, in the case that the thermoplastic elastomer (a-2-1d) obtained by copolymerizing ethylene and (meth)acrylic acid is used as the thermoplastic elastomer (a-2) and a vinyl monomer having an epoxy group and/or a glycidyl group is used as the vinyl monomer (a-1-2), the carboxyl group of the thermoplastic elastomer (a-2-1d) reacts with the epoxy group and/or the epoxy group (or the glycidyl group) in the acrylic copolymer (a-1) and/or the. epoxy group (or the glycidyl group) in the vinyl monomer (a-1-2), thereby forming a polymer alloy in which the grafted acrylic copolymer of the thermoplastic elastomer, the grafted vinyl monomer of the thermoplastic elastomer, the non-graft-modified thermoplastic elastomer (a-2-1) and the like are uniformly dispersed as dispersion phases in the acrylic copolymer (a-1) which is the continuous phase.

Particularly, in order to further enhance the dispersibility of the thermoplastic elastomer (a-2), it is preferred to employ any of the above methods (2), (3) and (4). Moreover, amounts of the respective components should suitably be determined so that the obtained resin composition (A) may become a predetermined composition ratio. In general, the thermoplastic elastomer is used in an amount of 0.5 to 20 parts by weight with respect to 100 parts by weight of the total amount of the vinyl monomer components (a-1-1) and (a-1-2) and the thermoplastic elastomer.

[Particle diameter of the dispersion phase]

With regard to the dispersion phase comprising the thermoplastic elastomer (a-2), the average diameter of its primary particle is preferably in the range of 1 nm to 30 $\mu$m, more preferably 1 nm to 10 $\mu$m. If the average diameter is within the above range, the chipping resistance of the coating film can sufficiently be improved, and the smoothness of the coating film is good.

[Curing agent component (B)]

The kind of curing agent (B) can suitably be selected in compliance with the kind of reactive functional group of the vinyl monomer (a-1-2). When the reactive functional group which the vinyl monomer (a-1-2) has is a hydroxyl group, an amino resin such as hexamethoxymethylmelamine or a blocked polyisocyanate such as isophorone diisocyanate blocked with $\epsilon$-caprolactam can be used; when the reactive functional group is a carboxyl group, a polyepoxy compound is used; and when it is an epoxy group and/or a glycidyl group, a polyvalent carboxylic acid (b-1) and/or a polyvalent carboxylic anhydride (b-2) is typically used.

A preferable example of the thermosetting powder coating composition according to the present invention is a thermosetting powder coating composition obtained by selecting an epoxy group and/or a glycidyl group as a reactive functional group which the acrylic copolymer (a-1) has, and using at least one compound selected from the group consisting of polyvalent carboxylic acids (b-1) and polyvalent carboxylic anhydrides (b-2) as the curing agent (B). Next, reference will be made to examples of the polyvalent carboxylic acids (b-1) and the polyvalent carboxylic anhydrides (b-2).

[Polyvalent carboxylic acid (b-1)]

As the polyvalent carboxylic acid (b-1), any of aliphatic, aromatic and alicyclic compounds can be used. Typical examples of the aromatic polyvalent carboxylic acids include isophthalic acid and trimellitic acid, and they may be used singly or in a combination thereof. Typical examples of the alicyclic polyvalent carboxylic acids include 1,3-cyclopentanedicarboxylic acid, 1,4-hexanedicarboxylic acid, 1,3-cyclohexanedicarboxylic acid and norbornanedicarboxylic acid, and they may be used singly or in a combination thereof. In addition, a polyester resin and the like having a carboxyl group can also be used. Nevertheless, in the present invention, it is preferable from the viewpoints of coating film characteristics such as smoothness and weathering resistance to use the aliphatic polyvalent carboxylic acids.

The conception of the term "aliphatic compounds" referred to in the specification of the present application covers not only the aliphatic compounds in a narrow sense but also alicyclic compounds having a substantially low aromatic degree. That is to say, the conception of the above "aliphatic compounds" also covers a group of compounds having a divalent hydrocarbon group with at least one carbon atom in the molecule and having a substantially low aromatic degree. Concretely, it covers a group consisting of compounds having, in the molecule, not only an aliphatic group in a narrow sense but also an alicyclic group having a substantially low aromatic degree, a combination of these groups, and divalent residues of these groups combined with a hydroxyl group, nitrogen, sulfur, silicon or phosphorus as well as compounds having, in the molecule, the above groups substituted by, for example, an alkyl group, a cycloalkyl group, an allyl group, an alkoxyl group, a cycloalkoxyl group, an allyloxyl group or a halogen (F, Cl, Br or the like). The various characteristics (heating resistance, toughness, decomposition properties, strength properties and the like) of the copolymer regarding the present invention can be controlled by suitably selecting these substituents. The conception of "the aliphatic compounds" referred to in the specification of the present application covers not only one kind of compound but also various combinations of two or more compounds.

[Aliphatic polyvalent carboxylic acid]

No particular restriction is put on aliphatic polyvalent carboxylic acid, so long as it is substantially an aliphatic compound having at least two carboxyl groups in the molecule, and one or more kinds of aliphatic polyvalent carboxylic acids can be used.

Examples of the aliphatic polyvalent carboxylic acid (b-1) include aliphatic dicarboxylic acids and the like. Typical examples of the aliphatic dicarboxylic acids include succinic acid, glutaric acid, adipic acid, pimelic acid, suberic acid, azelaic acid, sebacic acid, citric acid, undecanoic diacid, dodecanoic diacid, brassylic acid, eicosanoic diacid and octadecanoic diacid, and above all, dodecanoic diacid is preferable. They may be used singly or in a combination thereof.

As the aromatic degree of the aliphatic polyvalent carboxylic acid increases, film coating characteristics such as smoothness, impact resistance and weathering resistance deteriorate.

[Polyvalent carboxylic acid (b-2)]

The conceptions of the terms "acid anhydride", "anhydride group", "anhydride bond" and "polyanhydride" referred to in this specification also cover conceptions regarding these terms described in the item of "polyanhydrides" on page 996 to 998 of "Maruzen Polymer Great Dictionary"—Concise Encyclopedia of Polymer Science and Engineering (edited by Kroschwitz, translated by Tatsu Mita, Maruzen, Tokyo, 1994). The conception of "the acid anhydride" referred to in this specification also covers a conception described in the term of "Acid anhydride" on right column on pages 996 and 997 of Chemical Great Dictionary, Vol. 3 (published by Kyoritsu Shuppan Co., Ltd., 1963).

In the present invention, a linear aliphatic polyvalent carboxylic anhydride is preferable from the viewpoints of a crosslinking effect and the like. The linear anhydride of an aliphatic polyvalent carboxylic acid is a linear dimer or more oligoaliphatic or polyaliphatic acid anhydride substantially having or not having a carboxyl group in the molecule, and no particular restriction is put on the linear aliphatic polyvalent carboxylic anhydride, so long as it is a compound having at least two of carboxyl groups and/or acid anhydride groups substantially present in the molecule. These linear aliphatic polyvalent carboxylic anhydrides can be used singly or in a combination of two or more thereof.

In the specification of the present application, the conception of "the linear" also covers not only the linear compound but also a compound, having a large ring, of a linear dimer or more oligoaliphatic or polyaliphatic acid anhydride which can exert the same function as in the linear anhydride.

A typical example of the linear anhydride of the aliphatic polyvalent carboxylic acid is a linear polycondensate obtained by the dehydrocondensation of one or more kinds of aliphatic dicarboxylic acids. Among the anhydrides particularly effective for the improvement of the chipping resistance which can be used as the linear anhydride of the aliphatic polyvalent carboxylic acid, a certain kind of linear polycondensate obtained by the dehydrocondensation of one kind of aliphatic polyvalent carboxylic acid can be represented by the following general formula (1)

$$HO-[OC(CH_2)_mCOO]_n-H \quad (1)$$

wherein m is a natural number of 1 or more, and it is preferably 30 or less; and n is a natural number of 2 or more.

Typical examples of the linear anhydride of the aliphatic dicarboxylic acid effective for the improvement of the chipping resistance include dehydrated linear condensates of the aliphatic polyvalent carboxylic acids. Among these condensates, the dehydrated linear condensates of adipic acid, azelaic acid, sebacic acid, eicosanoic diacid and decanoic diacid are preferable, and the dehydrated linear condensate of decanoic diacid is more preferable.

As other typical examples of the polyvalent carboxylic anhydride, there can also suitably be used a polyisocyanate-modified dicarboxylic (poly) anhydride mentioned in EP-A-O 695,771 and a modified polyacid anhydride such as a polyol-modified polymer-like polyacid anhydride mentioned in EP-A-O 299,420.

The aliphatic dicarboxylic anhydride is preferably prepared so that its melting point may be within the range of 40 to 150° C.

[Formation of crosslinkage by the linear acid anhydride of the aliphatic dicarboxylic acid]

When a cyclic anhydride of a polyvalent carboxylic acid such as succinic anhydride or phthalic anhydride is reacted with a glycidyl group in the acrylic copolymer (a-1), this anhydride reacts only with an epoxy ring of the specific glycidyl group in the acrylic copolymer (a-1) molecule in a high possibility. Therefore, the effect of crosslinking the plurality of acrylic copolymers (a-1) is low.

On the other hand, when the (co)polycondensate of the aliphatic dicarboxylic acid is reacted with the glycidyl group, this condensate cleaves at an anhydride group portion to become a plurality of fragments, and each of these fragments reacts with each glycidyl group of the different acrylic copolymer (a-1) molecules to crosslink the plurality of acrylic copolymer (a-1) molecules. Therefore, owing to this effect of the above crosslinking, chemical characteristics such as solvent resistance and acid resistance of the coating film can be improved.

[Amount of the polyvalent carboxylic acid-based compound to be used]

The amount of the carboxyl group in the polyvalent carboxylic acid (b-1) is preferably in the range of 0.1 to 1.2 equivalents, more preferably 0.2 to 1.1 equivalents, most preferably 0.3 to 1.0 with respect to equivalent of the glycidyl group in the resin composition (A). Furthermore, the amount of the acid anhydride group in the polyvalent carboxylic anhydride (b-2) is preferably in the range of 0.1 to 1.2 equivalents, more preferably 0.2 to 1.1 equivalents, most preferably 0.4 to 1.0 with respect to equivalent of the glycidyl group in the resin composition (A). In addition, the total amount of the carboxyl group and/or the acid anhydride group present in a polyvalent carboxylic acid-based compound molecule is preferably in the range of 0.5 to 1.3 equivalents, more preferably 0.6 to 1.2 equivalents, most preferably 0.7 to 1.0 with respect to equivalent of the glycidyl group in the resin composition (A). If the amount of the polyvalent carboxylic acid-based compound to be used is within this range, characteristics such as solvent resistance and impact resistance of the coating film tend to be improved.

[Additives]

Various additives which have usually been added to the coating composition can be added to the thermosetting powder coating composition of the present invention. For example, a synthetic resin composition such as an epoxy resin, a polyester resin or a polyamide, a natural resin such as cellulose or a cellulose derivative, or a semisynthetic resin composition may be blended with the thermosetting powder coating composition in compliance with an object to improve the appearance and physical properties of the coating film.

Other additives may be blended with the thermosetting powder coating composition of the present invention in compliance with the object. Examples of the other additives include a curing catalyst, a pigment, a flow regulator, a thixotropy regulator, an antistatic agent, a surface regulator, a brightner, an anti-blocking agent, a plasticizer, an ultraviolet light absorber, a degasser and an antioxidant. Furthermore, when the thermosetting powder coating composition is used as a clear coating, a small amount of a pigment may be blended to color the coating composition to such a degree as not to completely lose clarity.

[Kneading of the powder coating composition]

No particular restriction is put on a temperature at which the composition comprising the resin composition (A) and the curing agent (B) is mechanically kneaded, so long as it permits the preparation of the substantially uniform powder coating composition. As a melting/kneading device, there can usually be used a heating roll, a heating kneader, an extruder or the like.

As a typical technique of blending the thermosetting powder coating composition of the present invention, there can be employed a method which comprises suitably combining kneaders such as a roll, a kneading machine, a mixer (a Banbury type, a transfer type or another type), a calender and an extruder, suitably setting the conditions of steps (temperature, melting or non-melting, rotational frequency, vacuum atmosphere, inert gas atmosphere and the like), sufficiently mixing the composition, and then using a grinding mill to obtain the uniformly finely ground powder coating composition. However, this method is not restrictive.

The mass-like coating composition obtained by the kneading is cooled, and then ground so that an average particle diameter may be within the range of about 10 to about 90 $\mu$m. As a grinder, a hammer mill can be used. One embodiment of a blend kneading step of adding the additives and the like to the powder coating composition of the present invention comprises, if necessary, adding additives such as a curing catalyst, an anti-blocking agent, a surface regulator, a plasticizer, an antistatic agent, a pigment, a filler and a bulk filler, sufficiently melting and kneading them within the temperature range of 40 to 140° C., cooling the mixture, and then uniformly grinding it into a suitable particle size (usually, 100 mesh or less).

[Coating method and baking method]

A coating object is coated with the powder of the thus ground thermosetting powder coating composition by a coating technique such as a static coating method or a flow immersion method, followed by heating, to thermally set the composition and to thereby form a coating film. The baking of the thermosetting powder coating composition according to the present invention can be performed usually at a temperature of about 100° C. to about 180° C., preferably about 120° C. to about 160° C. usually for about 10 minutes to about 60 minutes, whereby a crosslinking reaction between the copolymer (a-1) and the curing agent (B) can be carried out. After the baking, it is cooled to room temperature, thereby obtaining a coating film having excellent characteristics.

This coating film has the thermoplastic elastomer component as the dispersion phase and an organic polymer, as the continuous phase, comprising the acrylic copolymer component and the curing agent component, and having a three-dimensional crosslinking network structure and/or an IPN (interpenetrating network) structure, and this dispersion phase is uniformly held in the continuous phase. Usually in this coating film, the dispersion phase is uniformly held in the continuous phase by the three-dimensional crosslinking network structure and/or the IPN structure of the continuous phase, so that the whole coating film can exert impact resistant and chipping resistance owing to impact resistance which the dispersion phase has.

Furthermore, in the case that the thermosetting powder coating composition of the present invention is used as a face coating composition and a conventional solvent type coating composition or even an aqueous coating composition is used as its undercoating composition, the baked coating film regarding the present invention has excellent characteristics, as in the case that the solvent type coating composition is used.

That is to say, a coating operation is made with the aqueous undercoating composition (containing a pigment and/or a metallic powder), and after drying for a certain time, the thermosetting powder coating composition of the present invention is applied onto the undercoating composition by the above technique, followed by heating, to thermally set the composition and to thereby form a coating film.

The thermosetting powder coating composition of the present invention can also be used for the coating of bodies and parts (aluminum wheels, wipers, center pillars and the like) of automobiles. In addition, for the intercoating and the face coating of the bodies and the parts of automobiles, the thermosetting powder coating composition of the present invention can also be used.

Next, examples of the present invention will be described. The examples and preparation examples intent to assist the understanding of the contents of the invention regarding the present application, and the scope of the present invention should not be restricted at all by the description of these examples. In addition, "part(s)" and "%" in the examples are by weight, unless otherwise noted.

[Preparation of a coated plate for performance evaluation]

A black solvent type coating composition of polyester-melamine crosslinking was applied onto a satin steel plate treated with zinc phosphate and having a thickness of 0.8 mm so that a thickness of the coating composition might be 20 $\mu$m, and it was then baked at 170° C. for 30 minutes to prepare an undercoated steel plate.

[Performance evaluation]

The performance evaluation was carried out as follows.

(1) Impact Resistance Test (Du Pont type impact test)

The test was made in accordance with JIS K5400 6.13.3. A weight of 1 kg was used, and each value of evaluation results was represented by a height of a weight drop at which cracking or peeling occurred on a coating film.

(2) Chipping Test (Gravel shot test)

There was used a gravel meter (made by Suga Test Machine Co., Ltd.) designed in compliance with SAE-J400 and ASTM D-370 which were test procedures of coating films for automobiles in America. Here, the test was made as follows. A coated steel plate was allowed to stand at −30° C. for 4 hours in a freezer, cooled afterward immediately in a dry ice-methanol bath of −30° C. for 5 minutes, pulled up from the dry ice-methanol bath, and then set onto the gravel meter, and gravel was blown against the plate. A time taken from the pull-up of the plate from the dry ice-methanol bath to the blowing of the gravel was set to 5 seconds or less. The gravel for roads prescribed by JIS A5001 was used. 50 g of the gravel was used every the coated steel plate, and it was allowed to hit against the coated steel plate at one time. The pressure of compressed air used for the blowing was 390 kPa (gauge). The steel plate flawed by the hit of the gravel was allowed to stand at room temperature for 10 minutes, and the partially peeled coating film was then completely peeled off by the use of a masking tape. The chipping resistance was evaluated on the basis of an average diameter of the flaw. Therefore, the smaller the diameter of the flaw is, the better the chipping resistance is. If the average diameter of this flaw is less than 2.0 mm, the chipping resistance is judged to be excellent, and if it is 2.0 mm or more, the chipping resistance is judged to be poor.

(3) Weathering Resistance Test

An acceleration test was carried out for 2,000 hours by the use of a QUV tester, and gloss values of the coating film before and after the acceleration test were measured to obtain a gloss holding ratio. This gloss holding ratio was calculated in accordance with the following equation:

Gloss holding ratio (%)=(gloss value at 60° after acceleration test)÷(gloss value at 60° before acceleration test)×100

(4) Acid Resistance Test 10 vol % sulfuric acid was dropped on the surface of the coating film, allowed to stand at room temperature for 1 day, and then wiped out, and the appearance of the surface was observed. As a result, the surface on which any trace was not observed was represented by o, and the surface on which the trace was observed was represented by x.

(5) Visual Observation

The appearance of the coating film was observed, and the coating film having a particularly excellent smoothness was represented by ⊚; the coating film having a good smoothness was represented by o; the coating film having a usual smoothness was rep resented by Δ; and the coating film having a poor smoothness was represented by x.

(6) Gloss

The gloss was represented by a value (gloss at 60°) measured by a gloss meter.

(7) Solvent Resistance

After the coating film was rubbed reciprocatingly 50 times with a gauze impregnated with xylol, this coating film was observed. The surface on which any trace was not observed was represented by o, and the surface on which the trace was observed was represented by x.

(8) Pencil Scratching Test

The pencil scratching test was carried out in accordance with JIS K5400 6.14. Each value of the results was represented by a pencil hardness.

(9) Anti-blocking Test of the Powder Coating Composition 6.0 g of the powder coating composition were placed in a cylindrical container having an inner diameter of 20 mm, and after storage at 30° C. for 7 days, the powder was taken out. The blocking state of the powder coating composition was observed visually and by hand. The composition on which any blocking was not observed at all was represented by ⊚; the composition on which some blocking was observed was represented by o; and the composition on which serious blocking was observed was represented by x.

PREPARATION EXAMPLES 1 to 3
{Preparation of acrylic copolymers (a-1)}

66.7 parts of xylene were placed in a four-necked flask equipped with a stirrer, a thermometer, a reflux condenser and a nitrogen feed pipe, and it was then heated up to a reflux temperature. Here, 4.5 parts by weight of t-butyl-peroxy-2-ethyl hexanoate (trade name Perbutyl O, made by Nippon Oils & Fats., Ltd.) were dissolved as a polymerization initiator in each of monomers shown in Table 1, and the resultant mixed solution was added dropwise to the flask over 5 hours. Afterward, 0.5 part of Perbutyl O was further added dropwise thereto, and the solution was then maintained at 100° C. for 5 hours. Then, the used solvent was removed from the resultant polymer solution with heating and under reduced pressure to obtain solid acrylic copolymers (Preparation Examples 1 to 3). The characteristic values of the thus obtained copolymers are also shown in Table 1.

TABLE 1

Preparation Examples 1 to 3
[Preparation of the acrylic copolymer (a-1)]

|  | Preparation Example 1 | Preparation Example 2 | Preparation Example 3 |
| --- | --- | --- | --- |
| (a-1-1) |  |  |  |
| Styrene | 15.0 | 35.0 | 20.0 |
| Methyl methacrylate | 34.0 | 35.4 | 35.2 |
| n-Butyl methacrylate | 22.5 | — | 14.8 |
| 2-Ethylhexyl methacrylate | — | 8.6 | — |
| (a-1-2) |  |  |  |
| Glycidyl methacrylate | 28.5 | 21.0 | — |
| Hydroxyethyl methacrylate | — | — | 30.0 |
| Glass transition temperature (° C.) | 65 | 70 | 74 |
| Number-average molecular weight (Mn) | 3500 | 3000 | 2400 |

The various physical properties of the copolymers were measured by the following procedures.

(1) Glass transition temperature (Tg): On the basis of a monomer composition, it was obtained by the calculation of a Fox's equation.

(2) Number-average molecular weight (Mn): It was measured on the basis of polystyrene by GPC.

PREPARATION EXAMPLE 4
{Preparation of hydroxyethyl methacrylate-graft-modified thermoplastic elastomer (a-2)}

1,000 parts of xylene and 100 parts of a hydrogenated compound (trade name KRATON G1652) of a styrene-butadiene-styrene block copolymer made by Shell Chemical Co., Ltd. were placed in a four-necked flask equipped with a stirrer, a thermometer, a reflux condenser and a nitrogen feed pipe, and the system was then purged with a nitrogen gas. After the solution was heated up to 130° C., 100 g of a xylene solution in which 6.6 g of hydroxyethyl methacrylate and 0.6 g of dicumyl peroxide were dissolved were fed to the system over 5 hours by the use of a pump. After completion of the reaction, the system was cooled to about room temperature, and acetone was added and a hydroxyethyl methacrylate-graft-modified thermoplastic elastomer was then collected by filtration. Afterward, the precipitate was repeatedly washed with acetone. The washed precipitate was dried under reduced pressure while heated, thereby obtaining a white powdery modified resin. As a result of the measurement of a hydroxyl number of this modified resin, the content of hydroxyethyl methacrylate was 2.3% by weight.

PREPARATION EXAMPLE 5

{Preparation of glycidyl methacrylate-graft-modified thermoplastic elastomer (a-2)}

1,000 parts of xylene and 100 parts of a hydrogenated compound (trade name KRATON G1652) of a styrene-butadiene-styrene block copolymer made by Shell Chemical Co., Ltd. were placed in a four-necked flask equipped with a stirrer, a thermometer, a reflux condenser and a nitrogen feed pipe, and the system was then purged with a nitrogen gas. After the solution was heated up to 130° C., 100 g of a xylene solution in which 6.5 g of glycidyl methacrylate and 0.6 g of dicumyl peroxide were dissolved were fed to the system over 5 hours by the use of a pump. After completion of the reaction, the system was cooled to about room temperature, and acetone was added and a glycidyl methacrylate-graft-modified thermoplastic elastomer was then collected by filtration. Afterward, the precipitate was repeatedly washed with acetone. The washed precipitate was dried under reduced pressure while heated, thereby obtaining a white powdery modified resin. As a result of the measurement of an epoxy number of this modified resin, the content of glycidyl methacrylate was 2.0% by weight.

PREPARATION EXAMPLES 6 to 11
(Preparation 1 of resin compositions)

An acrylic copolymer (a-1) prepared in Preparation Examples 1 to 3 was blended with a thermoplastic elastomer (a-2) in each blend ratio shown in Table 2, and the blend was then uniformly dry-blended by a Henschel mixer. Afterward, the mixture was kneaded three times (three passes) at a cylinder temperature of 140° C. and 280 rpm of a screw rotational frequency by the use of an extruder YCS30 made by Buss Co., Ltd. to thereby obtain resin compositions for powder coating compositions (Preparation Examples 6 to 11).

TABLE 2

Preparation Examples 6 to 11
[Preparation 1 of the resin composition for the powder coating composition]

| | Preparation Example | | | | | |
|---|---|---|---|---|---|---|
| | 6 | 7 | 8 | 9 | 10 | 11 |
| Acrylic Copolymer (a-1) | | | | | | |
| Preparation Example 1 | 95.0 | — | — | 95.0 | 95.0 | 70.0 |
| Preparation Example 2 | — | 95.0 | — | — | — | — |
| Preparation Example 3 | — | — | 95.0 | — | — | — |

TABLE 2-continued

Preparation Examples 6 to 11
[Preparation 1 of the resin composition for the powder coating composition]

| | Preparation Example | | | | | |
|---|---|---|---|---|---|---|
| | 6 | 7 | 8 | 9 | 10 | 11 |
| Thermoplastic Elastomer (a-2) | | | | | | |
| TUFTEC H1031 | 5.0 | — | — | — | — | 30.0 |
| TUFTEC M1962 | — | 5.0 | 5.0 | — | — | — |
| TUFMER MP0610 | — | — | — | 5.0 | — | — |
| NUCREL N0200H | — | — | — | — | 5.0 | — |

TUFTEC H1031: Trademark; a hydrogenated compound of a styrene-butadiene-styrene block copolymer made by Asahi Chemical Industry Co., Ltd.
TUFTEC M1962: Trademark; a maleic anhydride-graft-modified product of a hydrogenated compound of a styrene-butadiene-styrene block copolymer made by Asahi Chemical Industry Co., Ltd.
TUFMER MP0610: Trademark; a maleic anhydride-graft-modified product of an olefinic elastomer made by Mitsui Chemicals, Inc.
NUCREL N0200H: Trademark; an ethylene-methacrylic copolymer made by Mitsui-Du Pont Polychemical Co., Ltd.

PREPARATION EXAMPLES 12 to 26

(Preparation 2 of resin compositions for powder coating compositions)

66.7 parts of xylene were placed in a four-necked flask equipped with a stirrer, a thermometer, a reflux condenser and a nitrogen feed pipe, and the system was then purged with a nitrogen gas. Furthermore, a thermoplastic elastomer component (a-2) was placed in the flask in each amount of weight parts shown in Tables 3 and 4, and the system was then heated up to a reflux temperature. 7.0 parts by weight of t-butyl-peroxy-2-ethyl hexanoate (trade name Perbutyl O, made by Nippon Oils & Fats., Ltd.) were dissolved as a polymerization initiator in each of monomers shown in Tables 3 and 4, and the resultant mixed solution was added dropwise to the flask over 5 hours. Afterward, 0.5 part of Perbutyl O was further added dropwise thereto, and the solution was then maintained at 100° C. for 5 hours. Afterward, the used solvent was removed from the resultant polymer solution under heating and reduced pressure to obtain solid resin compositions for powder coating compositions (Preparation Examples 12 to 26).

TABLE 3

Preparation Examples 12 to 20
(Preparation of the resin composition for the powder coating composition)

| | Comparative Example | | | | | | | | |
|---|---|---|---|---|---|---|---|---|---|
| | 12 | 13 | 14 | 15 | 16 | 17 | 18 | 19 | 20 |
| (a-1-1) | | | | | | | | | |
| Styrene | 15.0 | 15.0 | 35.0 | 15.0 | 15.0 | 15.0 | 15.0 | 15.0 | 15.0 |
| Methyl methacrylate | 34.0 | 34.0 | 35.4 | 34.0 | 34.0 | 34.0 | 34.0 | 34.0 | 34.0 |
| n-Butyl methacrylate | 22.5 | 22.5 | — | 22.5 | 22.5 | 22.5 | 22.5 | 22.5 | 22.5 |
| 2-Ethylhexyl methacrylate | — | — | 8.6 | — | — | — | — | — | — |

TABLE 3-continued

Preparation Examples 12 to 20
(Preparation of the resin composition for the powder coating composition)

| | Comparative Example | | | | | | | | |
|---|---|---|---|---|---|---|---|---|---|
| | 12 | 13 | 14 | 15 | 16 | 17 | 18 | 19 | 20 |
| (a-1-2) | | | | | | | | | |
| Glycidyl methacrylate | | | | | | | | | |
| Hydroxyethyl methacrylate | 28.5 | 28.5 | 21.0 | 28.5 | 28.5 | 28.5 | 28.5 | 28.5 | 28.5 |
| Thermoplastic Elastomer Component (a-2) | — | — | — | — | — | — | — | — | — |
| TUFTEC M1962 | 2.5 | 10.0 | 5.0 | — | — | — | — | — | — |
| SEPTON 2002 | — | — | — | 5.0 | — | — | — | — | — |
| TUFMER MP0610 | — | — | — | — | 5.0 | — | — | — | — |
| NUCREL N0200H | — | — | — | — | — | 5.0 | — | — | — |
| EVAFLEX-EEA A704 | — | — | — | — | — | — | 5.0 | — | — |
| EVAFLEX 45X | — | — | — | — | — | — | — | 5.0 | — |
| HPR AR201 | — | — | — | — | — | — | — | — | 5.0 |

TUFTEC M1962: Trademark; a maleic anhydride-graft-modified product of a hydrogenated compound of a styrene-butadiene-styrene block copolymer made by Asahi Chemical Industry Co., Ltd.

SEPTON 2002: Trademark; a hydrogenated compound of a styrene-isoprene-styrene block copolymer made by Kuraray Co., Ltd.

TUFMER MP0610: Trademark; a maleic anhydride-graft-modified product of an olefinic elastomer made by Mitsui Chemicals, Inc.

NUCREL N0200H: Trademark; an ethylene-methacrylic copolymer made by Mitsui-Du Pont Polychemical Co., Ltd.

EVAFLEX-EEA A704: Trademark; an ethylene-ethyl acrylate copolymer made by Mitsui-Du Pont Polychemical Co., Ltd.

EVAFLEX 45X: Trademark; an ethylene-vinyl acetate copolymer made by Mitsui-Du Pont Polychemical Co., Ltd.

HPR AR201: Trademark; a maleic anhydride-graft-modified product of an ethylene-ethyl acrylate copolymer made by Mitsui-Du Pont Polychemical Co., Ltd.

A very thin slice of the resin composition obtained in Preparation Example 15 wad dyed with $RuO_4$, and the dyed slice was then observed at a magnification of 20,000 by a transmission electron microscope. As a result, it was confirmed that the thermoplastic elastomer (a-2) was dispersed as a dispersion phase in an acrylic copolymer (a-1) which was a continuous phase, and the resin composition had a sea-island type microphase separation structure in which the primary particles of the elastomer were uniformly dispersed, with a particle diameter being 100±30 nm.

TABLE 4

Preparation Examples 21 to 26
(Preparation of the resin composition for the powder coating composition)

| | Comparative Example | | | | | |
|---|---|---|---|---|---|---|
| | 21 | 22 | 23 | 24 | 25 | 26 |
| (a-1-1) | | | | | | |
| Styrene | 15.0 | 20.0 | 15.0 | 15.0 | 15.0 | 15.0 |
| Methyl methacrylate | 34.0 | 35.2 | 34.0 | 34.0 | 34.0 | 34.0 |
| n-Butyl methacrylate | 22.5 | 14.8 | 22.5 | 22.5 | 22.5 | 22.5 |
| 2-Ethylhexyl methacrylate | — | — | — | — | — | — |

TABLE 4-continued

Preparation Examples 21 to 26
(Preparation of the resin composition for the powder coating composition)

| | Comparative Example | | | | | |
|---|---|---|---|---|---|---|
| | 21 | 22 | 23 | 24 | 25 | 26 |
| (a-1-2) | | | | | | |
| Glycidyl methacrylate | 28.5 | — | 28.5 | 28.5 | 28.5 | 28.5 |
| Hydroxyethyl methacrylate | — | 30.0 | — | — | — | — |
| Thermoplastic Elastomer Component (a-2) | | | | | | |
| TUFTEC M1962 | — | 5.0 | — | — | 0.2 | 30.0 |
| Preparation Example 4 | — | — | 5.0 | — | — | — |
| Preparation Example 5 | — | — | — | 5.0 | — | — |
| MIRASTOMER 5510B | 3.0 | — | — | — | — | — |

TUFTEC M1962: Trademark; a maleic anhydride-graft-modified product of a hydrogenated compound of a styrene-butadiene-styrene block copolymer made by Asahi Chemical Industry Co., Ltd.

MILASTOMER 5510B: Trademark, an olefinic elastomer made by Mitsui Chemicals, Inc.

PREPARATION EXAMPLES 27 to 32

(Preparation 3 of resin compositions for powder coating compositions)

100 parts by weight of xylene were placed in a four-necked flask equipped with a stirrer, a thermometer, a reflux condenser and a nitrogen feed pipe, and an acrylic copolymer prepared in Preparation Example 1 and a thermoplastic elastomer component (a-2) were added to the flask in each blend ratio shown in Table 5. Afterward, the system was purged with a nitrogen gas, and then heated up to a reflux temperature. After the heating, the solution was allowed to stand for 5 hours to uniformly dissolve the acrylic copolymer and the thermoplastic elastomer component. Afterward, the used solvent was removed from the xylene solution of the resultant resin under heating and reduced pressure to thereby obtain solid resin compositions for powder coating compositions (Preparation Examples 27 to 32).

TABLE 5

Preparation Examples 27 to 32
[Preparation 3 of the resin composition for the powder coating composition]

| | Preparation Example | | | | | |
|---|---|---|---|---|---|---|
| | 27 | 28 | 29 | 30 | 31 | 32 |
| Acrylic Copolymer (a-1) | | | | | | |
| Preparation Example 1 | 95.0 | 95.0 | 95.0 | 95.0 | 99.8 | 70.0 |
| Thermoplastic Elastomer Component | | | | | | |
| TUFTEC H1031 | 5.0 | — | — | — | 0.2 | 30.0 |
| Preparation Example 4 | — | 5.0 | — | — | — | — |
| Preparation Example 5 | — | — | 5.0 | — | — | — |
| NUCREL N0200H | — | — | — | 5.0 | — | — |

TUFTEC H1031: Trademark; a hydrogenated compound of a styrene-butadiene-styrene block copolymer made by Asahi Chemical Industry Co., Ltd.
NURCREL N0200H: Trademark; an ethylene-methacrylic copolymer made by Mitsui-Du Pont Polychemical Co., Ltd.

PREPARATION EXAMPLE 33
(Preparation of a linear acid anhydride curing agent of an aliphatic divalent carboxylic acid)

1 mol of dodecanoic diacid and 0.8 mol of acetic anhydride were placed in a reactor, and the mixture was then heated up to 150° C. While produced acetic acid was removed through a vacuum line so that acetic anhydride might not flow out of the system, reaction was carried out for 5 hours. Immediately after this step, the solution was cooled, and the resultant white solid was then collected. The melting point of this compound was in the range of 73 to 82° C.

Examples 1, 2, 4 TO 9, 14 TO 19, AND 21 TO 25

A resin (A) for a powder coating composition prepared in the preparation example was blended with dodecanoic diacid and titanium oxide (trademark Tipure R960, made by Du Pont) in each ratio (parts) shown in Table 6, and 1 part by weight of RESIMIX RL-4 (trademark, made by Mitsui Chemicals, Inc., a low-density acrylic resin, a flow regulator), 1 part by weight of TINUVIN 144 (trademark, made by Ciba Speciality Chemicals Co., Ltd.), 1 part by weight of benzoin (an anti-side seam agent) and 2 parts by weight of TINUVIN 900 (trademark, made by Ciba Speciality Chemicals Co., Ltd.) were added thereto. The mixture was then uniformly dry-blended by the use of a Henschel mixer, and then molten and kneaded at 90° C. by a heating roll. After the molten and kneaded material was cooled, it was finely ground by a grinding mill, and powder which was passed through a sieve of 150 mesh was collected to obtain a powder coating composition.

The thus obtained powder coating composition was applied onto an undercoated steel plate by a static applicator so that a film thickness might be in the range of 60 to 70 μm, and the plate was then heated at 160° C. for 30 minutes to obtain a test plate.

Examples 3 and 20

The same procedure as in Example 1 was conducted except that a resin (A) for a powder coating composition prepared in the preparation example was blended with IPDI.B1530 (ε-caprolactam-blocked isophorone diisocyanate, made by Dicel Hurus Co., Ltd.) as a curing agent (B) in a blend ratio shown in Table 6 and 0.1 part by weight of dibutyltin dilaurate (trademark Neostan U-100, made by Nittou Chemicals, Co., Ltd.) was added as a curing catalyst, thereby obtaining a test plate.

Example 10

The same procedure as in Example 15 was conducted except that a resin composition (A) for a powder coating composition prepared in Preparation Example 15 was blended with dodecanoic diacid anhydride prepared in Preparation Example 33 as a curing agent (B) in a blend ratio shown in Table 6 and 0.2 part by weight of tin octanoate (trademark Neostan U-28, made by Nittou Chemicals, Co., Ltd.) was added as a curing catalyst, thereby obtaining a test plate.

Example 11

The same procedure as in Example 15 was conducted except that a resin composition (A) for a powder coating composition prepared in Preparation Example 15 was blended with Crelan LS2125 which was a commercially available urethane-modified polyacid anhydride as a curing agent (B) in a blend ratio shown in Table 6 and 0.2 part by weight of tin octanoate (trademark Neostan U-28, made by Nittou Chemicals, Co., Ltd.) Wag added as a curing catalyst, thereby obtaining a test plate.

Example 12

The same procedure as in Example 15 was conducted except that a resin composition (A) for a powder coating composition prepared in Preparation Example 15 was blended with Additol VXL1381 (trademark, made by Vianova Resins Co., Ltd.) which was a commercially available aliphatic polyacid anhydride as a curing agent (B) in a blend ratio shown in Table 6 and 0.2 part by weight of tin octanoate (trademark Neostan U-28, made by Nittou Chemicals, Co., Ltd.) was added as a curing catalyst, thereby obtaining a test plate.

Example 13

The same procedure as in Example 9 was conducted except that titanium oxide was not used, to obtain a test plate.

Example 26

The same procedure as in Example 1 was conducted except that a resin composition (A) for a powder coating composition prepared in Preparation Example 30 was blended with sebacic acid as a curing agent (B) in a blend ratio shown in Table 6, thereby obtaining a test plate.

COMPARATIVE EXAMPLE 1

The same procedure as in Example 1 was conducted except that an acrylic copolymer prepared in Preparation Example 1 and dodecanoic diacid as a curing agent (B) were used in a blend ratio shown in Table 6, thereby obtaining a test plate.

COMPARATIVE EXAMPLE 2

The same procedure as in Example 10 was conducted except that an acrylic copolymer prepared in Preparation Example 2 was blended with dodecanoic diacid anhydride as a curing agent (B) prepared in Preparation Example 33 in a blend ratio shown in Table 7 and 0.2 part by weight of tin octanoate (trademark Neostan U-28, made by Nittou Chemicals, Co., Ltd.) was added as a curing catalyst, thereby obtaining a test plate.

COMPARATIVE EXAMPLE 3

The same procedure as in Example 3 was conducted except that an acrylic copolymer prepared in Preparation Example 3 was blended with IPDI.B1530 (ε-caprolactam-blocked isophorone diisocyanate, made by Dicel Hurus Co., Ltd.) as a curing agent in a blend ratio shown in Table 7 and 0.1 part by weight of dibutyltin dilaurate (trademark Neostan U-100, made by Nittou Chemicals, Co., Ltd.) was added as a curing catalyst, thereby obtaining a test plate.

COMPARATIVE EXAMPLES 4 to 8

The same procedure as in Example 1 was conducted except that a resin composition for a powder coating composition prepared in each preparation example and dodecanoic diacid as a curing agent were used in a blend ratio shown in Table 7, thereby obtaining a test plate.

COMPARATIVE EXAMPLE 9

74.1 parts of a main material (trade name ER-8105, made by Unitika Ltd.) of a polyester-based powder coating material were blended with 5.9 parts of triglycidyl isocyanurate as a curing agent and 20.0 parts of titanium dioxide (trademark Tipure R-960, made by Du Pont). The same addtives as in Example 1 were added to the blend, and the same procedure as in Example 1 was then conducted to obtain a powder coating composition. The thus obtained powder coating composition was applied onto an undercoated steel plate by a static spray so that a film thickness might be in the range of 60 to 70 μm, and the coated plate was then heated at 200° C. for 20 minutes to obtain a test plate.

TABLE 6

Coating Compositions in the Examples

| Example | Resin Component (A) | Curing Agent Component (B) | Pigment |
|---|---|---|---|
| 1 | Preparation Example 6, 82.6 | Dodecanoic diacid, 17.4 | 20.0 |
| 2 | Preparation Example 7, 83.5 | Dodecanoic diacid, 16.5 | 20.0 |
| 3 | Preparation Example 8, 60.7 | B1530, 39.3 | 20.0 |
| 4 | Preparation Example 9, 82.7 | Dodecanoic diacid, 17.3 | 20.0 |
| 5 | Preparation Example 10, 82.7 | Dodecanoic diacid, 17.3 | 20.0 |
| 6 | Preparation Example 12, 82.6 | Dodecanoic diacid, 17.4 | 20.0 |
| 7 | Preparation Example 13, 83.5 | Dodecanoic diacid, 16.5 | 20.0 |
| 8 | Preparation Example 14, 86.8 | Dodecanoic diacid, 13.2 | 20.0 |
| 9 | Preparation Example 15, 82.9 | Dodecanoic diacid, 17.1 | 20.0 |
| 10 | Preparation Example 15, 77.2 | Preparation Example 33, 22.8 | 20.0 |
| 11 | Preparation Example 15, 77.2 | Crelan LS125, 22.8 | 20.0 |
| 12 | Preparation Example 15, 76.4 | Additol VXL1381, 23.6 | 20.0 |
| 13 | Preparation Example 15, 82.9 | Dodecanoic diacid, 17.1 | — |
| 14 | Preparation Example 16, 83.0 | Dodecanoic diacid, 17.0 | 20.0 |
| 15 | Preparation Example 17, 83.0 | Dodecanoic diacid, 17.0 | 20.0 |
| 16 | Preparation Example 18, 82.9 | Dodecanoic diacid, 17.1 | 20.0 |
| 17 | Preparation Example 19, 82.9 | Dodecanoic diacid, 17.1 | 20.0 |
| 18 | Preparation Example 20, 83.0 | Dodecanoic diacid, 17.0 | 20.0 |
| 19 | Preparation Example 21, 82.7 | Dodecanoic diacid, 17.3 | 20.0 |
| 20 | Preparation Example 22, 60.7 | B1530, 39.3 | 20.0 |
| 21 | Preparation Example 23, 82.9 | Dodecanoic diacid, 17.1 | 20.0 |
| 22 | Preparation Example 24, 82.8 | Dodecanoic diacid, 17.2 | 20.0 |
| 23 | Preparation Example 27, 82.6 | Dodecanoic diacid, 17.4 | 20.0 |
| 24 | Preparation Example 28, 82.6 | Dodecanoic diacid, 17.4 | 20.0 |
| 25 | Preparation Example 29, 82.5 | Dodecanoic diacid, 17.5 | 20.0 |
| 26 | Preparation Example 30, 84.4 | Sebacic acid, 15.6 | 20.0 |

TABLE 7

Coating Compositions in the Comparative Examples

| Comp. Example | Resin Component (A) | Curing Agent Component (B) | Pigment |
|---|---|---|---|
| 1 | Preparation Example 1, 82.0 | Dodecanoic diacid, 18.0 | 20.0 |
| 2 | Preparation Example 2, 81.1 | Preparation Example 33, 18.9 | 20.0 |
| 3 | Preparation Example 3, 60.7 | B1530, 39.3 | 20.0 |
| 4 | Preparation Example 11, 85.4 | Dodecanoic diacid, 14.6 | 20.0 |
| 5 | Preparation Example 25, 82.3 | Dodecanoic diacid, 17.7 | 20.0 |
| 6 | Preparation Example 26, 85.7 | Dodecanoic diacid, 14.3 | 20.0 |
| 7 | Preparation Example 31, 82.0 | Dodecanoic diacid, 18.0 | 20.0 |
| 8 | Preparation Example 32, 85.4 | Dodecanoic diacid, 14.6 | 20.0 |

[Evaluation]

Tables 8 to 10 show the results of the evaluation of thermosetting powder coating compositions and coating films formed in Examples 1 to 26. In addition, Table 11 shows the results of the evaluation of thermosetting powder coating compositions and coating films formed in Comparative Examples 1 to 8 which are concerned with the above examples.

TABLE 8

(Evaluation results 1 in the examples)

| | Example | | | | | | | | |
|---|---|---|---|---|---|---|---|---|---|
| | 1 | 2 | 3 | 4 | 5 | 6 | 7 | 8 | 9 |
| Impact Test | | | | | | | | | |
| Du Pont Impact (cm) | | | | | | | | | |
| 1 kg | 50< | 50 | 40 | 50 | 50 | 50 | 45 | 50< | 50< |
| Chipping Resistance (mmφ) | 1.4 | 1.6 | 1.6 | 1.4 | 1.5 | 1.6 | 1.7 | 1.6 | 1.4 |
| Weathering Resistant, Gloss Holding Ratio (%) | 96 | 98 | 96 | 96 | 97 | 98 | 92 | 96 | 96 |
| Acid Resistance Test | ○ | ○ | ○ | ○ | ○ | ○ | ○ | ○ | ○ |
| Visual Observation | ⊙ | ⊙ | ○ | ⊙ | ⊙ | ⊙ | ⊙ | ⊙ | ⊙ |
| Gloss (60°) | 93 | 94 | 91 | 92 | 93 | 92 | 90 | 92 | 92 |
| Solvent Resistance | ○ | ○ | ○ | ○ | ○ | ○ | ○ | ○ | ○ |
| Coating Film Hardness | H | H | H | H | H | H | H | H | H |
| Blocking Resistance | ⊙ | ⊙ | ⊙ | ⊙ | ⊙ | ⊙ | ⊙ | ⊙ | ⊙ |

TABLE 9

(Evaluation results 2 in the examples)

| | Example | | | | | | | | |
|---|---|---|---|---|---|---|---|---|---|
| | 10 | 11 | 12 | 13 | 14 | 15 | 16 | 17 | 18 |
| Impact Test | | | | | | | | | |
| Du Pont Impact (cm) | | | | | | | | | |
| 1 kg | 50< | 50 | 40 | 50 | 50 | 50 | 45 | 50< | 50< |
| Chipping Resistance (mmφ) | 1.1 | 1.1 | 1.1 | 1.3 | 1.3 | 1.4 | 1.2 | 1.2 | 1.1 |
| Weathering Resistant, Gloss Holding Ratio (%) | 96 | 94 | 96 | 98 | 96 | 95 | 95 | 94 | 95 |
| Acid Resistance Test | ○ | ○ | ○ | ○ | ○ | ○ | ○ | ○ | ○ |
| Visual Observation | ⊙ | ○ | ⊙ | ⊙ | ⊙ | ⊙ | ⊙ | ⊙ | ⊙ |
| Gloss (60°) | 93 | 94 | 91 | 92 | 93 | 92 | 90 | 92 | 92 |
| Solvent Resistance | ○ | ○ | ○ | ○ | ○ | ○ | ○ | ○ | ○ |
| Coating Film Hardness | H | H | H | H | H | H | H | H | H |
| Blocking Resistance | ○ | ○ | ○ | ⊙ | ⊙ | ⊙ | ⊙ | ⊙ | ⊙ |

TABLE 10

(Evaluation results 3 in the examples)

| | Example | | | | | | | |
|---|---|---|---|---|---|---|---|---|
| | 19 | 20 | 21 | 22 | 23 | 24 | 25 | 26 |
| Impact Test | | | | | | | | |
| Du Pont Impact (cm) | | | | | | | | |
| 1 kg | 50< | 45 | 50< | 50< | 50< | 50< | 50< | 50< |
| Chipping Resistance (mmφ) | 1.3 | 1.3 | 1.0 | 1.0 | 1.4 | 1.3 | 1.3 | 1.4 |
| Weathering Resistant, Gloss Holding Ratio (%) | 96 | 94 | 96 | 94 | 95 | 96 | 96 | 98 |
| Acid Resistance Test | ○ | ○ | ○ | ○ | ○ | ○ | ○ | ○ |
| Visual Observation | ⊙ | ⊙ | ⊙ | ○ | ⊙ | ⊙ | ⊙ | ⊙ |
| Gloss (60°) | 93 | 92 | 92 | 93 | 91 | 93 | 92 | 92 |
| Solvent Resistance | ○ | ○ | ○ | ○ | ○ | ○ | ○ | ○ |
| Coating Film Hardness | H | H | H | H | H | H | H | H |
| Blocking Resistance | ⊙ | ⊙ | ⊙ | ⊙ | ⊙ | ⊙ | ⊙ | ⊙ |

TABLE 11

(Evaluation results in the Comparative examples)

| | Comparative Example | | | | | | | | |
|---|---|---|---|---|---|---|---|---|---|
| | 1 | 2 | 3 | 4 | 5 | 6 | 7 | 8 | 9 |
| Impact Test | | | | | | | | | |
| Du Pont Impact (cm) | | | | | | | | | |
| 1 kg | 25 | 25 | 15 | 50< | 25 | 50< | 25 | 50< | 50< |
| Chipping Resistance (mmφ) | 3.0 | 3.2 | 2.8 | 0.7 | 3.5 | 0.6 | 3.4 | 0.6 | 1.7 |
| Weathering Resistant, Gloss Holding Ratio (%) | 98 | 94 | 92 | 72 | 95 | 66 | 95 | 66 | 60 |
| Acid Resistance Test | ○ | ○ | ○ | X | ○ | X | ○ | X | X |
| Visual Observation | ⊚ | ⊚ | ○ | X | ⊚ | X | ⊚ | X | Δ |
| Gloss (60°) | 92 | 92 | 93 | 62 | 95 | 58 | 95 | 58 | 90 |
| Solvent Resistance | ○ | ○ | ○ | X | ○ | X | ○ | X | ○ |
| Coating Film Hardness | H | H | H | HB | H | HB | H | HB | H |
| Blocking Resistance | ⊚ | ○ | ⊚ | X | ⊚ | X | ⊚ | X | ⊚ |

The powder coating compositions of the present invention in Examples 1 to 26 shown in Tables 8 to 10 can exert impact resistance and chipping resistance equal to or more excellent than those of a polyester-based coating composition without impairing weathering resistance which is a feature of an acrylic powder coating composition. In addition, the powder coating compositions also have usual physical properties. That is to say, the coating films of the powder coating compositions have practical appearance, gloss, acid resistance and solvent resistance, and the powder coating compositions also have practical blocking resistance without any problems.

Comparative Examples 1 to 3 show the evaluation results of the resins for the powder coating compositions in which any thermoplastic elastomer component is not used, but in these cases, the impact resistance and the chipping resistance of the coating films are poor.

In Comparative Examples 4 to 8, there are used the resin compositions for the powder coating compositions in which the amounts of the thermoplastic elastomer components to be used are outside a range specified by the present invention. In Comparative Examples 4, 6 and 8, various characteristics of the coating films such as the appearance and the weathering resistance of the coating films as well as the blocking resistance of the power coating materials are poor, and in Comparative Examples 5 and 7, the improvement of the impact resistance and the chipping resistance is insufficient.

Comparative Example 9 shows the results of the evaluation of the coating film of the polyester-based powder coating composition and the powder coating composition, and in this case, the weathering resistance of the coating film is poor.

Possibility of Industrial Utilization

As described above, a powder coating composition of the present invention improves weathering resistance which is a defect of a coating film formed from an epoxy resin powder coating composition or a polyester powder coating composition. In addition, the powder coating composition has excellent impact resistance which is equal to that of the coating film formed from the polyester powder coating composition, and moreover, it is also excellent in chipping resistance which has heretofore scarcely been noted by a person skilled in the art.

The coating film formed from the powder coating composition of the present invention can simultaneously exert excellent weathering resistance, chipping resistance, impact resistance and appearance properties, and hence it is suitable for the coating of bodies and the like of vehicles such as automobiles. In particular, the coating film can extremely suitably be applied to coating films for the surfaces of bodies and chassis of vehicles such as the automobiles against which gravel and pebbles hit at a high relative velocity during running or which are exposed to the sunlight outdoors without any shelter or severe weather. conditions. Concretely, the thermosetting powder coating composition can suitably be applied to the coating, particularly intercoating and face coating, of bodies and parts (aluminum wheels, wipers, pillars, door handles, fenders, bonnets, air spoilers, stabilizers, front grilles and the like) of vehicles such as the automobiles.

When the powder coating composition of the present invention is used for the face coating of the above applications, the formed coating film is equal to or more excellent than a coating film formed from a solvent type coating composition in points of (1) appearance properties (smoothness, reflectibility and the like), (2) physical properties (impact resistance, chipping resistance, adhesive properties and the like), (3) chemical properties (acid resistance, acid rain resistance, solvent resistance and the like), and (4) weathering resistance and ultraviolet light resistance. Therefore, although being the powder coating composition, the powder coating composition of the present invention can sufficiently meet severe quality requirements in quality control. Also when the powder coating composition of the present invention is used for the intercoating, a similar good effect can be obtained. Furthermore, also when the powder coating composition is used for the intercoating and/or the face coating on an undercoating film formed by the undercoating (e.g., aqueous undercoating) of the above various applications, followed by braking, a similar good effect can be obtained.

What is claimed is:

1. A thermosetting powder coating composition comprising a resin composition (A) and a curing agent (B), wherein
the resin composition (A) has a sea-island microphase separation structure constituted of a continuous phase comprising an acrylic copolymer (a-1) and a dispersion phase comprising a thermoplastic elastomer (a-2),
the acrylic copolymer (a-1) constituting the continuous phase is obtained by polymerizing 40 to 99% by weight of a vinyl monomer (a-1-1) not having a functional group reactive to the curing agent (B) in its molecule and having at least one radical polymerizable vinyl group with 60 to 1% by weight of a vinyl monomer (a-1-2) having a functional group reactive to the curing agent (B) in its molecule and having at least one radical polymerizable vinyl group, the thermoplastic elastomer (a-2) constituting the dispersion phase is at least one elastomer selected from the group consisting of non-graft-modified thermoplastic elastomers (a-2-1) and graft-modified thermoplastic elastomers (a-2-2), and the total amount of the thermoplastic elastomer (a-2) constituting the dispersion phase is within the range of 0.5 to 20 parts by weight with respect to 100 parts by weight of the resin composition (A).

2. The thermosetting powder coating composition according to claim 1 wherein the non-graft-modified thermoplastic elastomer (a-2-1) is at least one elastomer selected from the group consisting of a styrene-based thermoplastic elastomer (a-2-1a) which is a copolymer substantially not having an unsaturated double bond in the main chain and which is constituted of a hydrogenated compound (SEBS) of an S-B-S type three-dimensional block copolymer comprising a hard segment S obtained by polymerizing an aromatic vinyl hydrocarbon and a soft segment B obtained by polymerizing a conjugated diene, a polyolefin-based thermoplastic elastomer (a-2-1b) which is a copolymer substantially not having an unsaturated double bond in the main chain and which is constituted of a hard segment obtained by polymerizing ethylene and/or propylene and a soft segment obtained by copolymerizing ethylene and/or an α-olefin having 3 or more carbon atoms, a thermoplastic elastomer (a-2-1c) substantially not having an unsaturated double bond in the main chain and obtained by copolymerizing ethylene and vinyl acetate and/or a (meth)acrylic ester, and a thermoplastic elastomer (a-2-1d) substantially not having an unsaturated double bond in the main chain and obtained by copolymerizing ethylene and a (meth) acrylic acid; and the graft-modified thermoplastic elastomer (a-2-2) is one of grafted compounds (a-2-2a) to (a-2-2d) of the thermoplastic elastomers having the above thermoplastic elastomers (a-2-1a) to (a-2-1d) as the main chains, respectively.

3. The thermosetting powder coating composition according to claim 2 wherein one of grafted compounds (a-2-2a) to (a-2-2d) of the thermoplastic elastomers has a structure where the thermoplastic elastomer is graft-modified with 0.1 to 10% by weight, to the weight of the main chain, of an α,β-unsaturated carboxylic acid or its anhydride.

4. The thermosetting powder coating composition according to claim 2 wherein the styrene-based thermoplastic elastomers (a-2-1a) is a hydrogenated compound of a styrene-butadiene-styrene three-dimensional block copolymer and/or a hydrogenated compound of a styrene-isoprene-styrene three-dimensional block copolymer.

5. The thermosetting powder coating composition according to claim 2 wherein the thermoplastic elastomer (a-2-1c) is a thermoplastic elastomer obtained by copolymerizing ethylene with vinyl acetate and/or ethyl acrylate.

6. The thermosetting powder coating composition according to claim 2 wherein the thermoplastic elastomer (a-2-1d) is a copolymer of ethylene and methacrylic acid, and the amount of methacrylic acid to be used is in the range of 1 to 10% by weight with respect to 100% by weight of the thermoplastic elastomer (a-2-1d).

7. The thermosetting powder coating composition according to claim 1 wherein the thermoplastic elastomer (a-2) has a weight-average molecular weight of 2,000 to 400,000.

8. The thermosetting powder coating composition according to claim 1 wherein the dispersion phase comprising the thermoplastic elastomer (a-2) has an average diameter of 1 nm to 30 μm in terms of a primary particle.

9. The thermosetting powder coating composition according to claim 1 wherein 50 to 100% by weight of a (meth) acrylic ester having an alkyl group of 1 to 14 carbon atoms and/or a cyclohexyl group is contained in 100% by weight of the vinyl monomer (a-1-1).

10. The thermosetting powder coating composition according to claim 1 wherein the vinyl monomer (a-1-2) is at least one monomer selected from the group consisting of glycidyl (meth)acrylate and β-methylglycidyl (meth) acrylate.

11. The thermosetting powder coating composition according to claim 1 wherein the acrylic copolymer (a-1) has a calculated glass transition point of 30 to 120° C.

12. The thermosetting powder coating composition according to claim 1 wherein the curing agent (B) is a polyvalent carboxylic acid (b-1) and/or a polyvalent carboxylic anhydride (b-2).

13. The thermosetting powder coating composition according to claim 12 wherein the polyvalent carboxylic acid (b-1) is an aliphatic polyvalent carboxylic acid, and the polyvalent carboxylic anhydride (b-2) is an aliphatic polyvalent carboxylic anhydride.

14. The thermosetting powder coating composition according to claim 12 wherein the resin composition (A) is a composition having a sea-island microphase separation structure obtained by radical-polymerizing the monomer (a-1-1) and the monomer (a-1-2) in the presence of the non-graft-modified thermoplastic elastomer (a-2-1) and/or an elastomer obtained by introducing a graft-modification group into the thermoplastic elastomer (a-2-1).

15. The thermosetting powder coating composition according to claim 14 wherein the elastomer in which the graft-modification group is introduced is obtained by using 0.1 to 10% by weight of an α,β-unsaturated carboxylic acid or its anhydride to the thermoplastic elastomer (a-2-1) to graft-modify the elastomer.

16. The thermosetting powder coating composition according to claim 14 wherein the radical polymerization of the vinyl monomer (a-1-1) and the vinyl monomer (a-1-2) is carried out in an inert organic solvent in an amount 0.3 to 5 times as much as the total weight of the resin composition (A).

17. The thermosetting powder coating composition according to claim 16 wherein the inert organic solvent is an aromatic organic solvent.

18. The thermosetting powder coating composition according to claim 17 wherein the aromatic organic solvent is toluene and/or xylene.

19. A method for preparing a thermosetting powder coating composition described in claim 1 which comprises a step of melting and kneading a raw material including a resin composition (A) and a curing agent (B), and a step of cooling and grinding the molten and kneaded material.

20. The method for preparing the thermosetting powder coating composition according to claim 19 wherein the melting and kneading step is carried out at a temperature of 40 to 130° C.

21. The thermosetting powder coating composition according to claim 1 wherein the non-graft-modified thermoplastic elastomer (a-2-1) is at least one elastomer selected from the group consisting of a styrene-based thermoplastic elastomer (a-2-1a) which is a copolymer lacking an unsaturated double bond in the main chain and which is constituted of a hydrogenated compound (SEBS) of an —S—B—S type three-dimensional block copolymer comprising a hard segment S which is a polymerized aromatic vinyl hydrocarbon and a soft segment B which is a polymerized conjugated diene, a polyolefin-based thermoplastic elastomer (a-2-1b) which is a copolymer lacking an unsaturated double bond in the main chain and which is constituted of a hard segment which is a copolymerized ethylene and/or an α-olefin having 3 or more carbon atoms, a thermoplastic elastomer (a-2-1c) lacking an unsaturated double bond in the main chain and which is a copolymerized ethylene and vinyl acetate and/or a (meth) acrylic ester, and a thermoplastic elastomer (a-2-1d) lacking an unsaturated double bond in the main chain and which is a copolymerized ethylene and a (meth)acrylic acid; and the graft-modified thermoplastic elastomer (a-2-2) is one of grated compounds (a-2-2a) to (a-2-2d) of the thermoplastic elastomers having the above thermoplastic elastomers (a-2-1a) to (a-2-1d) as the main chains, respectively.

22. The thermosetting powder coating composition according to claim 21 wherein the thermoplastic elastomer (a-2-1c) is a thermoplastic elastomer which is ethylene copolymerized with vinyl acetate and/or ethyl acrylate.

* * * * *

UNITED STATES PATENT AND TRADEMARK OFFICE
CERTIFICATE OF CORRECTION

PATENT NO. : 6,359,067 B1
DATED : March 19, 2002
INVENTOR(S) : Takahisa Miyawaki et al.

It is certified that error appears in the above-identified patent and that said Letters Patent is hereby corrected as shown below:

<u>Title page,</u>
Item [56], References Cited, U.S. PATENT DOCUMENTS, please change:
"4,871,837 A" to -- 4,877,837 --.

Signed and Sealed this

Eleventh Day of March, 2003

JAMES E. ROGAN
*Director of the United States Patent and Trademark Office*